US012337408B2

(12) United States Patent
Matsushita et al.

(10) Patent No.: US 12,337,408 B2
(45) Date of Patent: Jun. 24, 2025

(54) ELECTRICAL STEEL STRIP FRICTION STIR WELDING METHOD AND METHOD OF PRODUCING ELECTRICAL STEEL STRIP

(71) Applicant: JFE STEEL CORPORATION, Tokyo (JP)

(72) Inventors: Muneo Matsushita, Tokyo (JP); Shohei Iwata, Tokyo (JP); Kai Tomita, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/704,917

(22) PCT Filed: Aug. 1, 2022

(86) PCT No.: PCT/JP2022/029562
§ 371 (c)(1),
(2) Date: Apr. 26, 2024

(87) PCT Pub. No.: WO2023/100420
PCT Pub. Date: Jun. 8, 2023

(65) Prior Publication Data
US 2024/0424598 A1 Dec. 26, 2024

(30) Foreign Application Priority Data
Nov. 30, 2021 (JP) .................. 2021-194988

(51) Int. Cl.
*B23K 20/12* (2006.01)
*B23K 101/16* (2006.01)
*B23K 103/04* (2006.01)

(52) U.S. Cl.
CPC ...... *B23K 20/1245* (2013.01); *B23K 20/1275* (2013.01); *B23K 2101/16* (2018.08); *B23K 2103/04* (2018.08)

(58) Field of Classification Search
CPC ............ B23K 20/1245; B23K 20/1275; B23K 2103/04; B23K 2101/16
See application file for complete search history.

(56) References Cited

U.S. PATENT DOCUMENTS 5,460,317 A    10/1995  Thomas et al.
5,697,511 A *  12/1997  Bampton ........... B23K 20/1265
                                                    228/180.1
(Continued)

FOREIGN PATENT DOCUMENTS

EP    2474382 A1    7/2012
EP    2502698 A1    9/2012
(Continued)

OTHER PUBLICATIONS

Ling Cui et al., Friction stir welding of a high carbon steel, Scripta Materialia, 2007, pp. 637-640, vol. 56.
(Continued)

*Primary Examiner* — Jason L Vaughan
(74) *Attorney, Agent, or Firm* — KENJA IP LAW PC

(57) ABSTRACT

Provided is an electrical steel strip friction stir welding method that is able to inhibit the occurrence of coil joint fractures on a production line caused by deterioration of mechanical properties and shape of the coil joint while maintaining high work efficiency and that is also advantageous in terms of rotating tool durability. In the method, preheated double-sided friction stir welding is performed, diameter D (mm) of shoulders of rotating tools satisfies the relationship of the following Expression (7), and rotation speed RS (r/min) of the rotating tools, the diameter D (mm) of shoulders of the rotating tools, and joining speed JS (mm/min), expressed as $RS \times D^3/JS$, satisfy the relationship of the following Expression (8), $4 \times TJ \le D \le 10 \times TJ \ldots$ (7), and $180 \times TJ \le RS \times D^3/JS \le 1500 \times TJ \ldots$ (8).

20 Claims, 14 Drawing Sheets

(56) References Cited

U.S. PATENT DOCUMENTS

| | | | |
|---|---|---|---|
| 6,460,752 B1 * | 10/2002 | Waldron | B23K 20/126 228/2.1 |
| 6,913,186 B2 * | 7/2005 | Vyas | B23K 20/1235 228/2.1 |
| 7,078,647 B2 * | 7/2006 | Kou | B23K 28/02 228/112.1 |
| 2009/0056404 A1 | 3/2009 | Fujii et al. | |
| 2009/0261146 A1 * | 10/2009 | Hou | B23K 20/124 228/2.1 |
| 2010/0159265 A1 * | 6/2010 | Fairchild | C22C 38/04 219/137 R |
| 2011/0132968 A1 | 6/2011 | Nakagawa et al. | |
| 2014/0123720 A1 * | 5/2014 | Alber | B21C 23/142 29/458 |
| 2016/0221117 A1 * | 8/2016 | Taniguchi | C21D 1/42 |
| 2016/0318239 A1 * | 11/2016 | Silvanus | B23K 20/22 |
| 2019/0111514 A1 | 4/2019 | Matsushita et al. | |
| 2020/0215644 A1 | 7/2020 | Matsushita et al. | |
| 2020/0238434 A1 | 7/2020 | Matsushita et al. | |
| 2020/0306871 A1 | 10/2020 | Matsushita et al. | |
| 2021/0023650 A1 | 1/2021 | Matsushita et al. | |
| 2022/0371119 A1 | 11/2022 | Matsushita et al. | |

FOREIGN PATENT DOCUMENTS

| | | |
|---|---|---|
| JP | H05305466 A | 11/1993 |
| JP | H07505090 A | 6/1995 |
| JP | 2000334577 A | 12/2000 |
| JP | 2003170280 A | 6/2003 |
| JP | 2003181655 A | 7/2003 |
| JP | 2003290936 A | 10/2003 |
| JP | 2004025284 A | 1/2004 |
| JP | 2004195480 A | 7/2004 |
| JP | 2011115846 A | 6/2011 |
| JP | 2011140026 A | 7/2011 |
| JP | 4838385 B2 | 12/2011 |
| JP | 4838388 B2 | 12/2011 |
| JP | 5185103 B2 | 4/2013 |
| JP | 2015127063 A | 7/2015 |
| JP | 6332561 B2 | 5/2018 |
| JP | 6332562 B2 | 5/2018 |
| JP | 2018095956 A | 6/2018 |
| JP | 6497451 B2 | 4/2019 |
| JP | WO2019026864 A1 | 8/2019 |
| JP | WO2019054400 A1 | 11/2019 |
| JP | 2020124739 A | 8/2020 |
| JP | 2021053700 A | 4/2021 |
| WO | 2011024320 A1 | 3/2011 |
| WO | 2018070317 A1 | 4/2018 |
| WO | 2019054400 A1 | 3/2019 |
| WO | 2019182020 A1 | 9/2019 |
| WO | 2021060176 A1 | 4/2021 |

OTHER PUBLICATIONS

Mar. 8, 2023, Office Action issued by the Taiwan Intellectual Property Office in the corresponding Taiwanese Patent Application No. 111130115 with English language Search Report.
Oct. 4, 2022, International Search Report issued in the International Patent Application No. PCT/JP2022/029562.

* cited by examiner

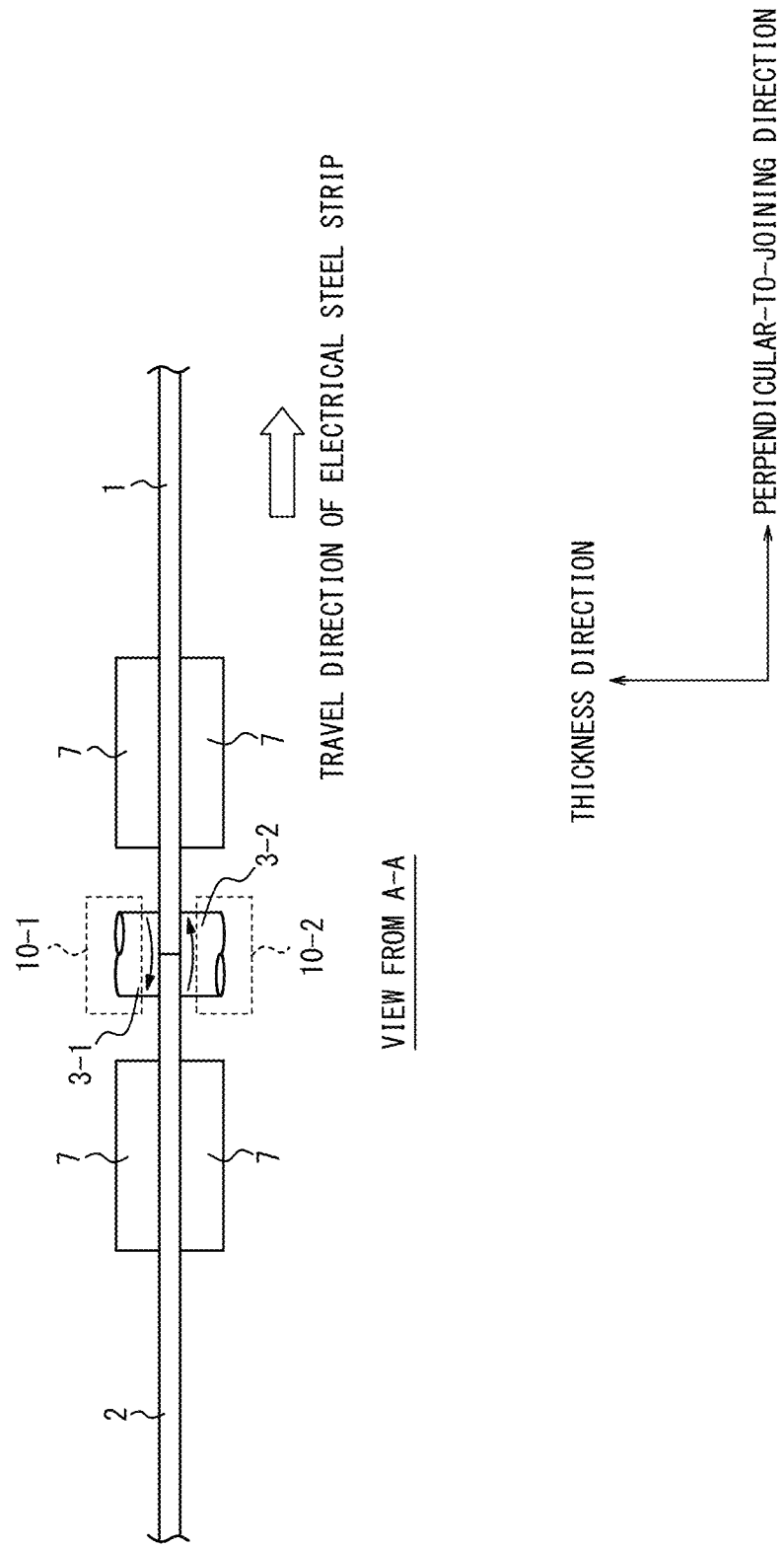

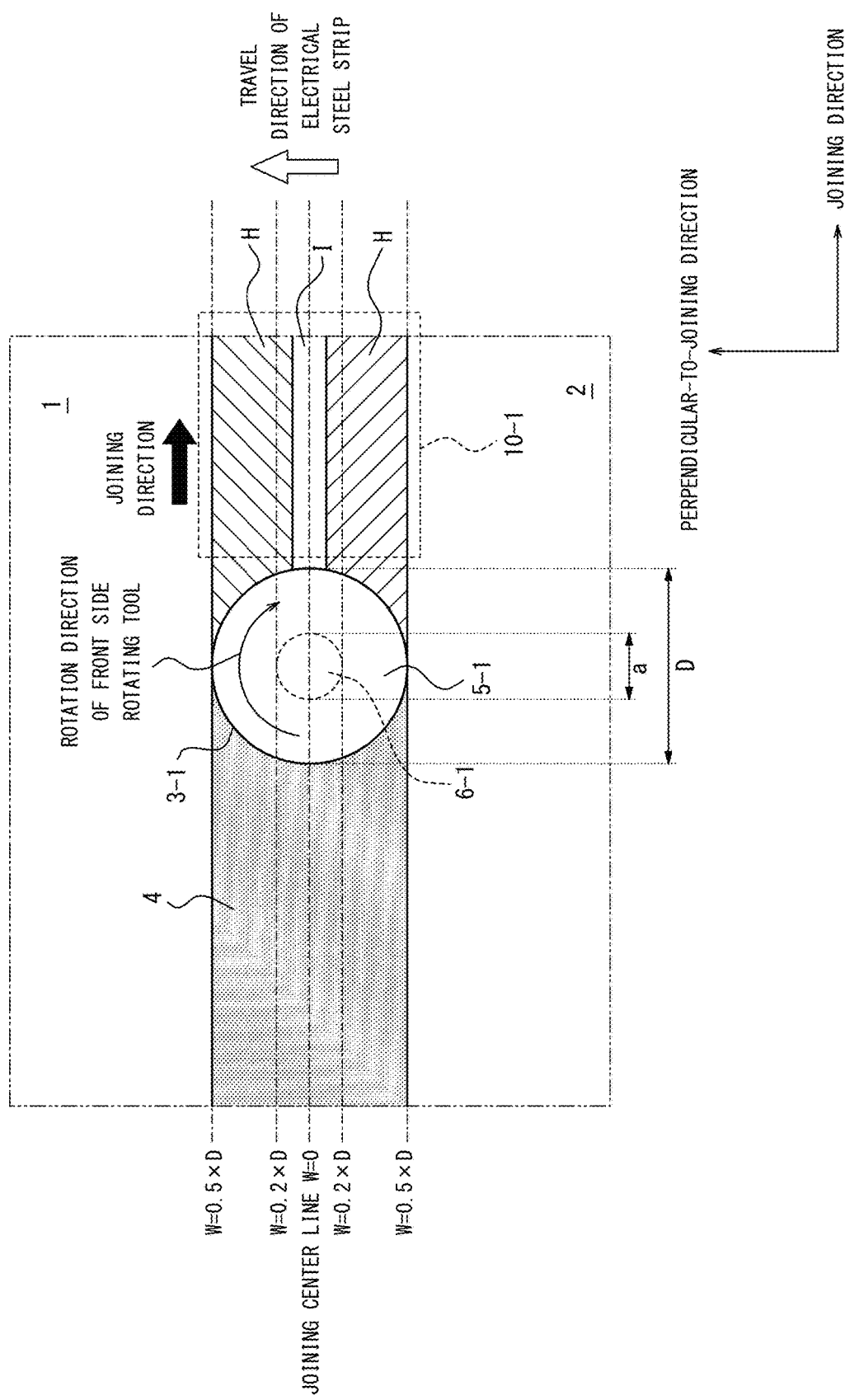

ELECTRICAL STEEL STRIP FRICTION STIR WELDING METHOD AND METHOD OF PRODUCING ELECTRICAL STEEL STRIP

TECHNICAL FIELD

The present disclosure relates to an electrical steel strip friction stir welding method and a method of producing an electrical steel strip.

BACKGROUND

In steel sheet production lines, such as pickling, cold rolling, annealing, and coating or plating production lines, in order to improve productivity and increase yield, performing so-called coil joining then passing a steel strip through the production line is common. Here, coil joining refers to the joining of an end (trailing end) of a preceding steel strip and an end (leading end) of the steel strip following the preceding steel strip (hereinafter also referred to as trailing steel strip) in a production line. Hereinafter, a joined portion formed by coil joining is also referred to as a coil joint. The leading end is the end of the steel strip in the direction of travel on the production line. Further, the trailing end is the end of the steel strip in the direction opposite the direction of travel on the production line. Coil joining enables rolling and the like with tension applied to the entire length of the steel strip. Further, coil joining enables highly precise control of strip thickness and shape even at the leading and trailing ends of the steel strip.

In coil joining, conventionally, flash butt welding and the like are commonly applied. However, with advances in laser welders, laser welding is becoming a mainstream application for coil joining in, for example, production lines for electrical steel sheets, stainless steel sheets, and high tensile strength steel sheets.

As examples of such technology, Patent Literature (PTL) 1 describes:

"A high-Si steel laser welding method comprising, when welding high-Si steel, welding using a filler wire containing Ni as the main component or supplying powder filler containing Ni as the main component, so that the chemical composition of weld metal satisfies the following Expression (1).

$$X = [\% \text{ Ni}] - [\% \text{ Si}] \times 2.5 - ([\% \text{ Cr}] + [\% \text{ Mo}]) \times 0.4 \geq 0 \quad (1)$$

Here, [% Ni], [% Si], [% Cr], and [% Mo] represent content (wt %) of Ni, Si, Cr, and Mo in the weld metal, respectively."

PTL 2 describes:

"In a laser welding method for butt welding a leading sheet and a trailing sheet using a filler wire, a ratio (Gap/DEPO) of the butt gap (Gap) between the leading sheet and the trailing sheet to an average width of the weld metal (DEPO) at an initial stage of welding is 0.3 to 0.8."

PTL 3 describes:

"In a welded portion formed by laser welding a leading sheet and a trailing sheet made of special steel that are conveyed on a continuous cold rolling line,
when L1 is the minimum thickness of base metal existing below an upper extension portion consisting of weld metal that extends to the upper side of the base metal due to cold rolling, and L2 is the minimum thickness of the base metal between the upper extension portion and a lower extension portion consisting of weld metal that extends to the lower side of the base metal due to cold rolling, then at least one of L1 or L2 is greater than zero."

CITATION LIST

Patent Literature

PTL 1: JP H5-305466 A
PTL 2: JP 2004-25284 A
PTL 3: JP 2011-140026 A
PTL 4: JP H07-505090 A (publication in Japan of WO 9310935 A1)
PTL 5: JP 2000-334577 A
PTL 6: JP 4838385 B2
PTL 7: JP 4838388 B2
PTL 8: JP WO 2019/26864 A1
PTL 9: JP WO 2019/54400 A1
PTL 10: JP 5185103 B2
PTL 11: JP 2015-127063 A
PTL 12: JP 2003-181655 A
PTL 13: JP 2003-290936 A
PTL 14: JP 2004-195480 A
PTL 15: JP 2011-115846 A
PTL 16: JP 6332561 B2
PTL 17: JP 6332562 B2
PTL 18: JP 6497451 B2
PTL 19: JP 2020-124739 A

Non-Patent Literature

NPL 1: Cui, L.; Fujii, H.; Tsuji, N.; Nogi, K. Scripta Mater. 2007, 56, p. 637-640.

SUMMARY

Technical Problem

Laser welding is fusion welding, and therefore causes embrittlement due to impurity segregation during fusion and solidification, and due to hydrogen entry. As a result, deterioration of mechanical properties of the joined portion (welded portion) may occur. In particular, electrical steel sheet chemical composition contains a large amount of Si, and therefore mechanical properties of coil joints tend to deteriorate significantly. Therefore, when laser welding as in PTL 1 to 3 is applied as coil joining of electrical steel strips, there is a problem in that a fracture may occur at a coil joint, resulting in a drop in productivity due to line stoppage and the like on a production line such as a continuous cold rolling line.

Further, electrical steel strips are continuously conveyed in a production line for electrical steel sheets, and therefore it is also desired to improve the work efficiency of coil joining. Furthermore, as the work efficiency of coil joining is improved, it is also desired to improve the durability (extend the service life) of a rotating tool.

It would be helpful to provide an electrical steel strip friction stir welding method that is able to inhibit the occurrence of coil joint fractures on a production line caused by deterioration of mechanical properties and shape of the coil joint while maintaining high work efficiency and that is also advantageous in terms of rotating tool durability.

Further, it would be helpful to provide a method of producing an electrical steel strip using the electrical steel strip friction stir welding method.

Solution to Problem

The inventors conducted intensive studies to solve the technical problem outlined above. First, the inventors investigated and examined the reasons for the deterioration of mechanical properties and shape of coil joints when laser welding is applied as coil joining of electrical steel strips, and made the following discoveries.

(a) As mentioned above, electrical steel sheet chemical composition contains a large amount of Si, for example 2.0 mass % to 5.0 mass %. Si is a ferrite-stabilizing element. Therefore, when typical laser welding is applied to coil joining of electrical steel strips, ferrite crystal grains in the coil joint, which is a fusion zone, and also ferrite crystal grains in a heat-affected zone, become coarse. This greatly degrades mechanical properties of the coil joint, especially toughness and bending strength, and leads to the occurrence of coil joint fracture in the production line.

(b) Further, the technologies in PTL 1 to 3 use a filler mainly composed of Ni, an austenite-stabilizing element. Therefore, at the coil joints, mainly austenite phase is obtained. However, according to the technologies described in PTL 1 to 3, it is necessary to control balance between Ni equivalent and Cr equivalent in the fusion zone (weld metal) properly at all times by eliminating variation of the butt gap between the preceding steel strip and the trailing steel strip and by extremely strictly controlling an amount of fusion of the filler and the steel sheet at the fusion zone (weld metal). In other words, when the balance between the Ni equivalent and the Cr equivalent in the fusion zone (weld metal) is not properly controlled, a martensitic phase that is a hard and brittle microstructure forms in the coil joint. This greatly degrades mechanical properties of the coil joint, especially toughness. Further, in the heat-affected zone, mechanical properties of the coil joint deteriorate greatly due to the coarsening of ferrite crystal grains. These reasons lead to the occurrence of coil joint fracture in a production line.

(c) Further, the above-mentioned variation in the butt gap between the preceding steel strip and the trailing steel strip affects weld reinforcement height. For example, when weld reinforcement height is high and a welded portion is excessively convex, stresses will be concentrated at the weld toe portions when the weld is under load. Therefore, the above-mentioned variation in the butt gap between the preceding steel strip and the trailing steel strip is also a cause of coil joint fracture occurrence in a production line. Excess weld may be removed by grinding or other means. However, such an increase in processing leads to a significant decrease in productivity.

Based on the above discoveries, the inventors further conducted various investigations and arrived at the idea of applying friction stir welding as electrical steel strip coil joining.

Here, friction stir welding is solid phase joining that utilizes frictional heat between a rotating tool and material to be joined and plastic flow of the material to be joined. In other words, a rotating tool is used to friction stir an unjoined portion (region to be joined) of the material to be joined. When the unjoined portion of the material to be joined is heated by frictional heat, plastic flow begins. An interface between a plastic flow zone and a base metal portion is then greatly elongated. As a result, clean interfaces without oxides come into contact with each other, and a joined portion is formed without fusion of the material to be joined. Here, a joined portion is a region that undergoes hot working due to frictional heat between the rotating tool and the material to be joined and plastic flow to form a recrystallized microstructure, and is sometimes referred to as a stir zone. Further, a region adjacent to the joined portion is affected by hot working due to frictional heat and plastic flow, but the region is formed having a microstructure without recrystallization, due to insufficient temperature and working. This region is called a thermo-mechanically affected zone. Further, a region also exists in the material to be joined that is not affected by hot working due to frictional heat and plastic flow. This region is called a base metal portion. Technology related to friction stir welding is described in, for example, PTL 4 to 19 and NPL 1, but none of these are applicable to electrical steel strip coil joining.

Based on the above ideas, the inventors conducted further studies and came to the following discoveries.

(d) In order to advantageously solve the problems in (a) to (c) above, the following points are important.

The material to be joined is preheated.

So-called double-sided friction stir welding is applied as a joining method.

Further, the diameter D (mm) of shoulder of the rotating tool satisfies the relationship of the following Expression (7).

Furthermore, joining conditions are appropriately controlled. In particular, a rotation speed RS (r/min) of the rotating tool, the diameter D (mm) of the shoulder of the rotating tool, and a joining speed JS (mm/min), expressed as $RS \times D^3/JS$, satisfy the relationship of the following Expression (8).

As a result, even when electrical steel strips are used as the material to be joined, mechanical properties of the coil joint are improved without causing deterioration of the shape of the coil joint, and the occurrence of coil joint fractures in a production line is effectively inhibited. Further, joining speed may be increased while inhibiting the occurrence of defects, and this provides excellent work efficiency and is very advantageous in terms of productivity. Furthermore, it is advantageous in terms of rotating tool durability. Hereinafter, double-sided friction stir welding in which the material to be joined is preheated is also referred to as preheated double-sided friction stir welding.

$$4 \times TJ \leq D \leq 10 \times TJ \quad (7)$$

$$180 \times TJ \leq RS \times D^3/JS \leq 1500 \times TJ \quad (8)$$

Here, TJ is defined such that, when the unjoined portion is a butted portion, TJ is the average value (mm) of the thickness of a first electrical steel strip and the thickness of a second electrical steel strip, and when the unjoined portion is an overlapped portion, TJ is the thickness (mm) of the overlapped portion.

(e) Further, in addition to satisfying both of the relationships of Expressions (7) and (8) above, the steel microstructures of the joined portion and thermo-mechanically affected zone are preferably made to be mainly ferrite, and both refinement of the steel microstructures of the joined portion and thermo-mechanically affected zone and reduction of a hardness difference between the joined portion and the base metal portion are preferred. Specifically, satisfying the relationships of the following Expressions (1) to (4) at the same time is preferred.

As a result, even when electrical steel strips are used as the material to be joined, mechanical properties of the coil joint are improved without causing deterioration of the shape of the coil joint, and the occurrence of coil joint fractures in a production line is more effectively inhibited.

$$Dsz \leq 200 \ \mu m \quad (1)$$

$$Dhaz1 \leq Dbm1 \quad (2)$$

$$Dhaz2 \leq Dbm2 \quad (3)$$

$$0.9 \times (Hbm1 + Hbm2)/2 \leq Hsz \leq 1.2 \times (Hbm1 + Hbm2)/2 \quad (4)$$

Here,

Dsz is an average value (μm) of ferrite grain size of the joined portion,

Dhaz1 is an average value (μm) of ferrite grain size of the thermo-mechanically affected zone on a first electrical steel strip side, Dhaz2 is an average value (μm) of ferrite grain size of the thermo-mechanically affected zone on a second electrical steel strip side, Dbm1 is an average value (μm) of ferrite grain size of the base metal portion of the first electrical steel strip, Dbm2 is an average value (μm) of ferrite grain size of the base metal portion of the second electrical steel strip, Hsz is an average value of hardness of the joined portion, Hbm1 is an average value of hardness of the base metal portion of the first electrical steel strip, and Hbm2 is an average value of hardness of the base metal portion of the second electrical steel strip.

(f) In addition, by applying preheated double-sided friction stir welding as a joining method and satisfying both of the relationships of Expressions (7) and (8) above, the stirring function is further enhanced. Therefore, it becomes possible to use a rotating tool without a probe that has only a shoulder at the lead end of the rotating tool (hereinafter also referred to simply as a rotating tool without a probe). In other words, in a typical rotating tool (hereinafter also referred to as a rotating tool with a probe), a probe (pin) is disposed at the lead end, the probe protruding from the shoulder. As a result, the probe is subjected to greater stress than the shoulder and is prone to breakage and wear. Therefore, the use of a rotating tool without a probe is very advantageous in terms of durability and extended service life of the rotating tool, and thus in reducing joint failure rates (due to wear and break age of the rotating tool). Here, a rotating tool without a probe is, for example, a rotating tool without a probe in which a leading end of the rotating tool (contact surface with the material to be joined) is a plane, a convex curved surface, or a concave curved surface.

(g) Further, for a rotating tool without a probe, a spiral-shaped stepped portion spiraling in the opposite direction to rotation is preferably provided on the leading end of the rotating tool. This promotes plastic flow to increase joining speed and further improve work efficiency.

The present disclosure is based on these discoveries and further studies.

Primary features of the present disclosure are as follows.

1. An electrical steel strip friction stir welding method for joining a first electrical steel strip and a second electrical steel strip as a material to be joined by a pair of rotating tools facing each other, comprising:

a preheating process of preheating an unjoined portion of the material to be joined by a heating device disposed in front of the rotating tools in a joining direction on at least one side of the material to be joined; and a joining process of pressing the rotating tools into the unjoined portion of the material to be joined from both sides while rotating the rotating tools in opposite directions, and joining the first electrical steel strip and the second electrical steel strip by moving the rotating tools in the joining direction, wherein the unjoined portion of the material to be joined is a butted portion or an overlapped portion between an end of the first electrical steel strip and an end of the second electrical steel strip following the first electrical steel strip, the preheating process and the joining process are performed continuously by moving the heating device in the joining direction in conjunction with the rotating tools, the diameter D (mm) of shoulders of the rotating tools satisfies the relationship of the following Expression (7), and a rotation speed RS (r/min) of the rotating tools, the diameter D (mm) of the shoulders of the rotating tools, and a joining speed JS (mm/min), expressed as RS×D³/JS, satisfy the relationship of the following Expression (8), $$4 \times TJ \leq D \leq 10 \times TJ \quad (7)$$

$$180 \times TJ \leq RS \times D^3/JS \leq 1500 \times TJ \quad (8)$$

where TJ is defined such that, when the unjoined portion is the butted portion, TJ is an average value (mm) of the thickness of the first electrical steel strip and the thickness of the second electrical steel strip, and when the unjoined portion is the overlapped portion, TJ is the thickness (mm) of the overlapped portion.

2. The electrical steel strip friction stir welding method according to aspect 1, wherein in the joining process, joining is performed under conditions that steel microstructures of a joined portion and a thermo-mechanically affected zone formed by joining of the first electrical steel strip and the second electrical steel strip become mainly ferrite phase, respectively, and the relationships of the following Expressions (1) to (4) are satisfied, $$Dsz \leq 200 \ \mu m \quad (1)$$

$$Dhaz1 \leq Dbm1 \quad (2)$$

$$Dhaz2 \leq Dbm2 \quad (3)$$

$$0.9 \times (Hbm1 + (Hbm2)/2 \leq Hsz \leq 1.2 \times (Hbm1 + Hbm2)/2 \quad (4)$$

wherein

Dsz is an average value (μm) of ferrite grain size of the joined portion,

Dhaz1 is an average value (μm) of ferrite grain size of a thermo-mechanically affected zone on a first electrical steel strip side, Dhaz2 is an average value (μm) of ferrite grain size of a thermo-mechanically affected zone on a second electrical steel strip side, Dbm1 is an average value (μm) of ferrite grain size of a base metal portion of the first electrical steel strip, Dbm2 is an average value (μm) of ferrite grain size of a base metal portion of the second electrical steel strip, Hsz is an average value of hardness of the joined portion, Hbm1 is an average value of hardness of the base metal portion of the first electrical steel strip, and Hbm2 is an average value of hardness of the base metal portion of the second electrical steel strip.

3. The electrical steel strip friction stir welding method according to aspect 1 or 2, wherein in the joining process, the joining is performed under conditions satisfying the relationships of the following Expressions (5) and (6), $$0.8 \times TbmL \le TszL \tag{5}$$

$$TszH \le 1.3 \times TbmH \tag{6}$$

wherein

TszL is the minimum value (mm) of the thickness of the joined portion,

TszH is the maximum value (mm) of the thickness of the joined portion,

TbmL is the thickness (mm) of the thinner of the first electrical steel strip and the second electrical steel strip, TbmH is the thickness (mm) of the thicker of the first electrical steel strip and the second electrical steel strip, and when the thicknesses of the first electrical steel strip and the second electrical steel strip are the same, TbmL=TbmH.

4. The electrical steel strip friction stir welding method according to any one of aspects 1 to 3, wherein in the joining process, a gap G (mm) between the shoulders of the rotating tools satisfies the relationship of the following Expression (9), $$0.4 \times TJ \le G \le 0.9 \times TJ \tag{9}$$

5. The electrical steel strip friction stir welding method according to any one of aspects 1 to 4, wherein the rotating tools are rotating tools without probes.

6. The electrical steel strip friction stir welding method according to aspect 5, wherein the leading ends of the rotating tools are each a flat, convex curved, or concave curved surface.

7. The electrical steel strip friction stir welding method according to aspect 5 or 6, wherein the leading ends of the rotating tools each have a spiral-shaped stepped portion spiraling in the opposite direction to rotation.

8. The electrical steel strip friction stir welding method according to aspect 7, wherein each of the spiral-shaped stepped portions becomes gradually lower from the center to the periphery of the leading end of the rotating tool.

9. The electrical steel strip friction stir welding method according to aspect 7, wherein each of the spiral-shaped stepped portions becomes gradually higher from the center to the periphery of the leading end of the rotating tool.

10. The electrical steel strip friction stir welding method according to any one of aspects 5 to 9, wherein a tilt angle α of the rotating tools is 0°.

11. The electrical steel strip friction stir welding method according to any one of aspects 1 to 10, wherein in the preheating process, a preheating temperature of the material to be joined satisfies the relationships of the following Expressions (11) to (13), $$100 \le TP_{W=0} \le 1000 \tag{11}$$

$$100 \le TP_{W=0.2D} \le 1000 \tag{12}$$

$$50 \le TP_{W=0.5D} \le 800 \tag{13}$$

wherein

W is a distance (mm) separated from a joining center line of the material to be joined in a perpendicular-to-joining direction, $TP_{W=0}$, $TP_{W=0.2D}$, and $TP_{W=0.5D}$ are preheating temperatures (° C.) at a surface of the material to be joined at positions where W=0, 0.2×D, and 0.5×D, respectively, and D is the diameter (mm) of the shoulders of the rotating tools.

12. The electrical steel strip friction stir welding method according to aspect 11, wherein in the preheating process, the preheating temperature of the material to be joined satisfies the relationships of the following Expressions (14) and (15), $$0.70 \le TP_{W=0.2D}/TP_{W=0} \le 1.00 \tag{14}$$

$$TP_{W=0.5D}/TP_{W=0} \le 0.45. \tag{15}$$

13. The electrical steel strip friction stir welding method according to any one of aspects 1 to 12, wherein the heating device is a high-frequency induction heating device, a laser irradiation heating device, or a device combining a high-frequency induction heating device and a laser irradiation heating device.

14. A method of producing an electrical steel strip, the method comprising:

joining a first electrical steel strip and a second electrical steel strip by the electrical steel strip friction stir welding method according to any one of aspects 1 to 13 to obtain a joined steel strip; and cold rolling the joined steel strip to obtain a cold-rolled steel strip.

Advantageous Effect

According to the present disclosure, even when electrical steel strips are used as the material to be joined, no deterioration of mechanical properties or shape of the coil joint occurs, and the occurrence of coil joint fractures in a production line is effectively inhibited. Further, joining speed may be increased while inhibiting the occurrence of defects. In particular, the joining speed can be increased to 3500 mm/min or more and even 4000 mm/min or more, and this provides excellent work efficiency and is very advantageous in terms of productivity. Further, even if the joining speed is increased, it is possible to obtain excellent rotating tool durability (extend service life of the rotating tool). Accordingly, productivity of electrical steel sheets is further improved, and industrial applicability is very high. Furthermore, preheated double-sided friction stir welding according to an embodiment of the present disclosure allows the use of rotating tools without probes, and this is very advantageous in terms of further improving the durability of the rotating tools, and thus in reducing joint failure rates.

BRIEF DESCRIPTION OF THE DRAWINGS

In the accompanying drawings:

FIG. 1B is a view from A-A in FIG. 1A;

FIG. 1C is a top view of FIG. 1A;

DETAILED DESCRIPTION

The following describes embodiments of the present disclosure.

[1] Electrical Steel Strip Friction Stir Welding Method

Figure 1A:
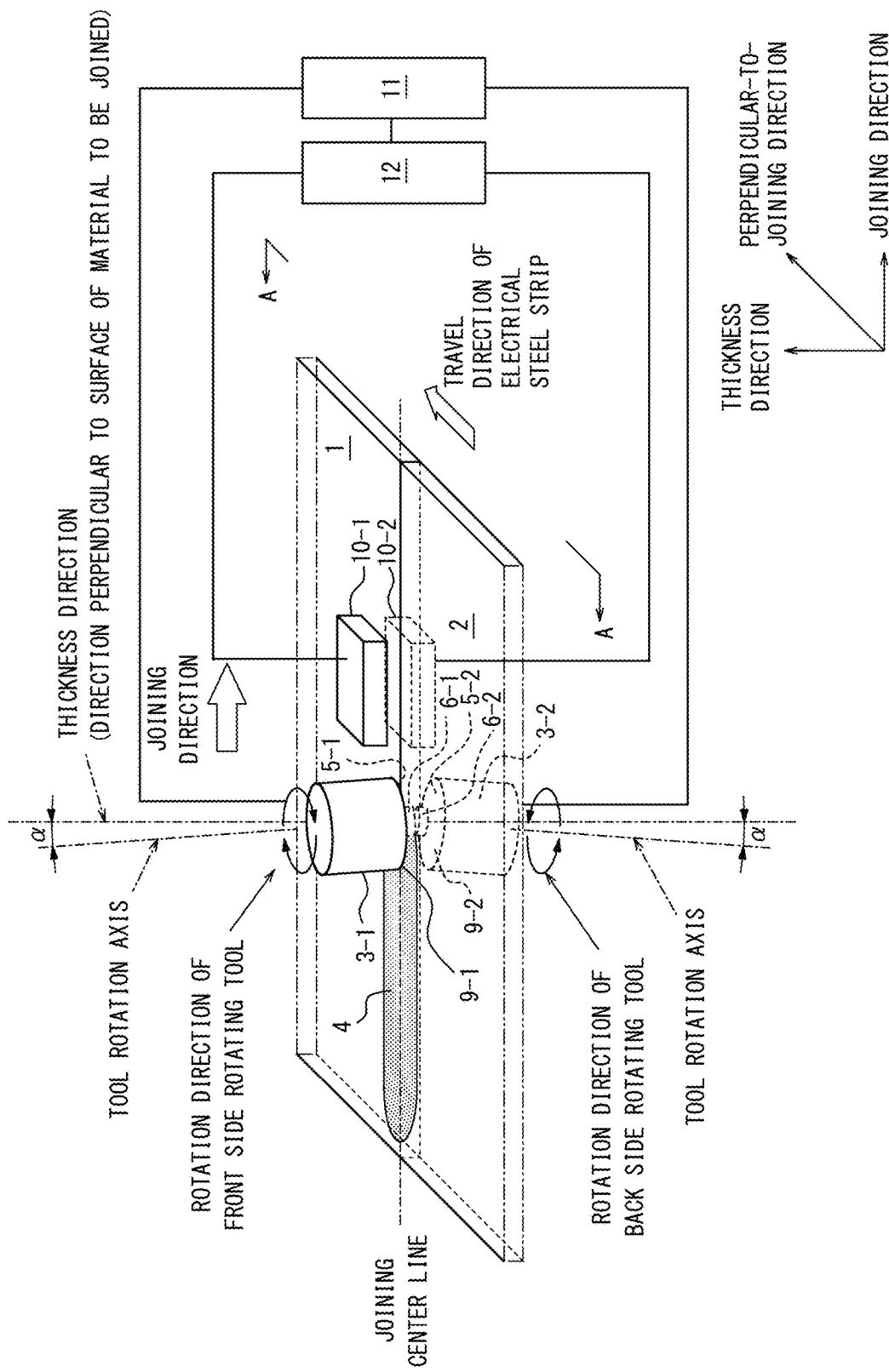
FIG. 1A is a schematic diagram for explanation of an electrical steel strip friction stir welding method according to an embodiment of the present disclosure, and is a side perspective view illustrating an example of a butt joint by preheated double-sided friction stir welding.
Figure 1D:
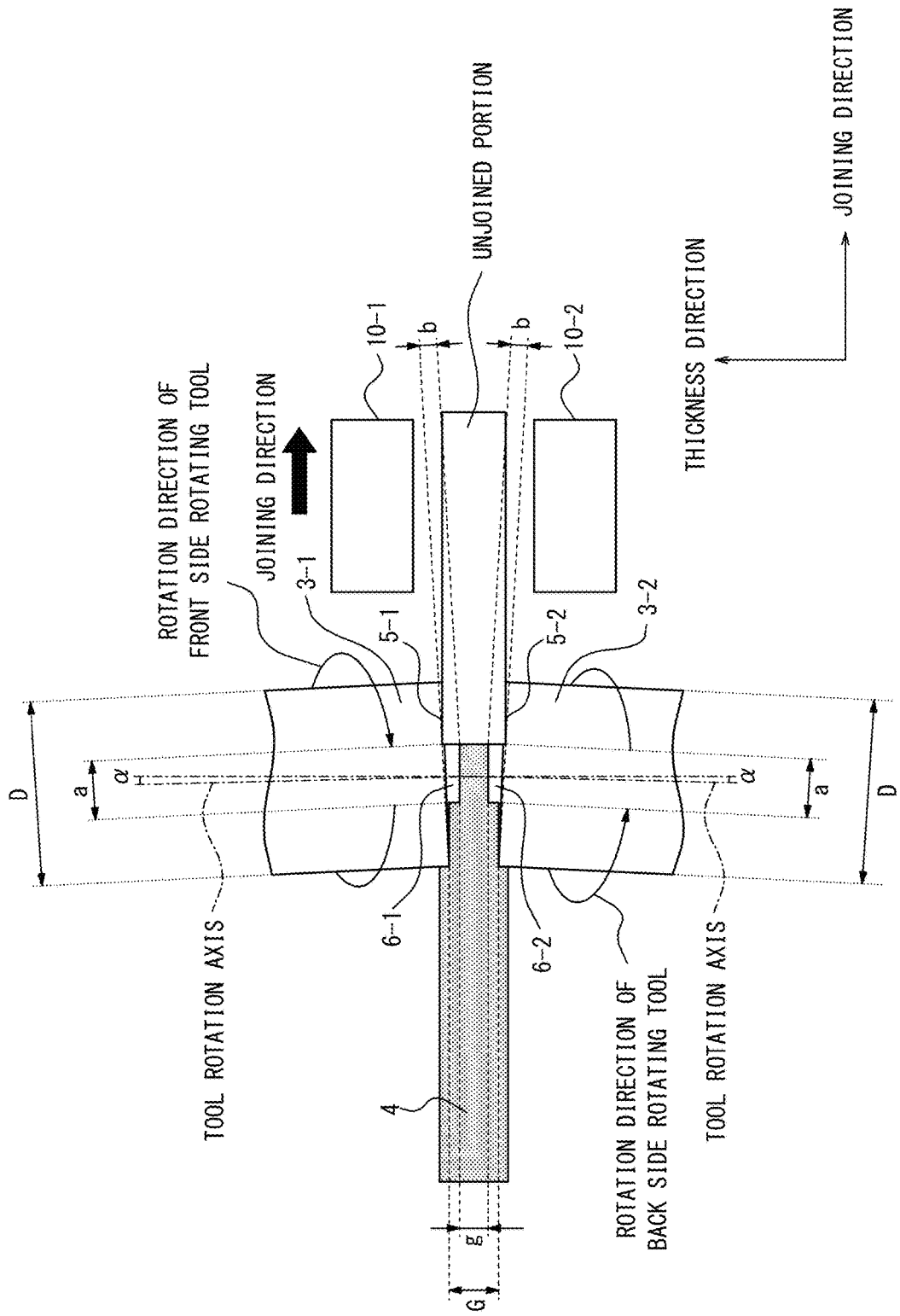
FIG. 1D is a cross section view at a joining center line position of FIG. 1A.

First, the electrical steel strip friction stir welding method according to an embodiment of the present disclosure is described, with reference to FIG. 1A to FIG. 1D. FIG. 1A to FIG. 1D are schematic diagrams for explaining the electrical steel strip friction stir welding method according to an embodiment of the present disclosure, where FIG. 1A is a side perspective view, FIG. 1B is a view from A-A in FIG. 1A, FIG. 1C is a top view of FIG. 1A, and FIG. 1D is a cross section view at a joining center line position of FIG. 1A.

In the drawings, reference sign 1 indicates a first electrical steel strip (material to be joined), 2 indicates a second electrical steel strip (material to be joined), 3-1 indicates a rotating tool (front side rotating tool), 3-2 indicates a rotating tool (back side rotating tool), 4 indicates a joined portion, 5-1 and 5-2 indicate shoulders, 6-1 and 6-2 indicate probes (pins), 7 indicates a gripping device, 9-1 and 9-2 indicate lead ends, 10-1 indicates a heating device (front side heating device), 10-2 indicates a heating device (back side heating device), 11 indicates a driving device for the rotating tools, and 12 indicates an operation control device. The gripping device is not illustrated in FIG. 1A. Further, α indicates a tilt angle (°) of the rotating tool, a indicates diameter (mm) of a probe portion (hereinafter referred to as pin diameter), b indicates length (mm) of the probe portion (hereinafter referred to as pin length), D indicates diameter (mm) of the shoulder of the rotating tool, g indicates a gap (mm) between probes, G indicates a gap between the shoulders of the rotating tools, and H and I indicate preheating regions (regions to be preheated) by the heating devices. For the sake of clarity, the heating device of 10-1 (front side heating device) and/or the heating device of 10-2 (back side heating device) are indicated by dashed lines in FIG. 1B and FIG. 1C. Note that the front side is different from a surface, although they are the same written in kanji and need to be distinguished from each other in Japanese.

In FIG. 1A to FIG. 1D, the arrangement of each portion is indicated in
- the joining direction (the direction of travel of the rotating tool),
- the perpendicular-to-joining direction (direction perpendicular to the joining direction and perpendicular to the thickness direction, which corresponds to the width direction of the joined portion and the direction of travel of the electrical steel strips in FIG. 1A to FIG. 1D, and
- the thickness direction (direction perpendicular to the surface of the material to be joined).

For example, in FIG. 1B, the vertical direction is the thickness direction. The horizontal direction is the perpendicular-to-joining direction. The direction perpendicular to the plane of the paper towards the reader is the joining direction. That is, the plane illustrated in FIG. 1B includes the perpendicular-to-joining direction and the thickness direction. Further, the heating devices of 10-1 and 10-2, which are indicated in dashed lines, are located in front of the rotating tools of 3-1 and 3-2 in the direction perpendicular to the plane of the paper towards the reader. Similarly, the heating device of 10-1 indicated in dashed lines in FIG. 1C is located in front of the preheating regions H and I in the direction perpendicular to the plane of the paper towards the reader.

Electrical steel strip here refers to an intermediate product used as material for producing an electrical steel sheet, in particular an intermediate product at a stage from the end of hot rolling to before heat treatment for primary recrystallization (that is, decarburization annealing or primary recrystallization annealing). An electrical steel strip produced by the method of producing an electrical steel strip according to an embodiment of the present disclosure is obtained by cold rolling after joining the first electrical steel strip and the second electrical steel strip, as described below. Hereinafter, an electrical steel strip obtained by joining the first electrical steel strip and the second electrical steel strip may also be referred to as a joined steel strip, and an electrical steel strip obtained by cold rolling the joined steel strip may also be referred to as a cold-rolled steel strip. Further, the electrical steel strip friction stir welding method according to an embodiment of the present disclosure is suitable, for example, for implementation in a production line for an electrical steel strip, especially in a continuous cold rolling line. Here, a continuous cold rolling line is a production line where steel strips are continuously cold rolled by a cold rolling device. A continuous cold rolling line includes, for example, a steel strip conveyor and a cold rolling device. A continuous cold rolling line may optionally be accompanied by a pickling device, an annealing furnace, a coating device, and the like.

The electrical steel strip friction stir welding method according to an embodiment of the present disclosure applies the preheated double-sided friction stir welding as electrical steel strip coil joining, as described above. In addition to that, the diameter D (mm) of shoulders of the rotating tools satisfies the relationship of the following Expression (7), and a rotation speed RS (r/min) of the rotating tools, the diameter D (mm) of shoulders of the rotating tools, and a joining speed JS (mm/min), expressed as RS×D³/JS, satisfy the relationship of the following Expression (8).

$$4 \times TJ \le D \le 10 \times TJ \tag{7}$$

$$180 \times TJ \le RS \times D^3/JS \le 1500 \times TJ \tag{8}$$

Here, TJ is defined such that, when the unjoined portion is a butted portion, TJ is the average value (mm) of the thickness of the first electrical steel strip and the thickness of the second electrical steel strip, and when the unjoined portion is an overlapped portion, TJ is the thickness (mm) of the overlapped portion.

More specifically, the electrical steel strip friction stir welding method according to an embodiment of the present disclosure is an electrical steel strip friction stir welding method for joining a first electrical steel strip and a second electrical steel strip as a material to be joined by a pair of rotating tools facing each other, including a preheating process of preheating an unjoined portion of the material to be joined by a heating device disposed in front of the rotating tools in a joining direction on at least one side of the material to be joined; and a joining process of pressing the rotating tools into the unjoined portion of the material to be joined from both sides while rotating the rotating tools in opposite directions, and joining the first electrical steel strip and the second electrical steel strip by moving the rotating tools in the joining direction, where the unjoined portion of the material to be joined is a butted portion or an overlapped portion between an end of the first electrical steel strip and an end of the second electrical steel strip following the first electrical steel strip, the preheating process and the joining process are performed continuously by moving the heating device in the joining direction in conjunction with the rotating tools, the diameter D (mm) of shoulders of the rotating tools satisfies the relationship of the above Expression (7), and a rotation speed RS (r/min) of the rotating tools, the diameter D (mm) of shoulders of the rotating tools, and a joining speed JS (mm/min), expressed as RS×D³/JS, satisfy the relationship of the above Expression (8).

Here, butt joints and lap joints are preferred examples of joint types.

In a butt joint, end faces of the first electrical steel strip and the second electrical steel strip face each other, and a rotating tool is pressed against the butted portion including the end faces (butting face) of the first electrical steel strip and the second electrical steel strip while rotating. In this state, the first electrical steel strip and the second electrical steel strip are joined by moving the rotating tool in the joining direction.

In a lap joint, at least a portion of end portions of the first electrical steel strip and the second electrical steel strip are overlapped and a rotating tool is pressed against the overlapped portion while rotating. In this state, the first electrical steel strip and the second electrical steel strip are joined by moving the rotating tool in the joining direction.

Butt joints and lap joints differ only in the form of the unjoined portion and other device configurations are basically the same, and therefore a case of a butt joint by preheated doubled-sided friction stir welding is described as an example, as illustrated in FIG. 1A to FIG. 1D. The preheated double-sided friction stir welding method is a friction stir welding method in which the first electrical steel strip and the second electrical steel strip as the material to be joined are preheated and then joined using a pair of rotating tools facing each other. The pair of rotating tools facing each other are pressed into the unjoined portion of the preheated material to be joined from both sides of the unjoined portion while rotating in opposite directions. In this state, the rotating tools are then moved in the joining direction to join the first electrical steel strip and the second electrical steel strip.

The preheated double-sided friction stir welding uses, for example, a friction stir welding device including
- a gripping device (not illustrated) that grips the material to be joined,
- a pair of rotating tools facing each other,
- a driving device for the rotating tools,
- a heating device disposed in front of the rotating tools in the joining direction on at least one side of the material to be joined, and
- an operation control device for the gripping device, the driving device for the rotating tools, and the heating device, as illustrated in FIG. 1A.

The operation control device controls, for example, the tilt angle α of the rotating tools, the position of the lead ends of the rotating tools and the distance g between the lead ends (probes) (hereinafter also referred to as the gap g between probes), a gap G between the shoulders of the rotating tools, joining speed (and the moving speed in the joining direction of the heating device that moves in conjunction with the rotating tools), pressure load, rotation speed of the rotating tools, rotation torque, output of the heating device, and the like.

In preheated double-sided friction stir welding, the rotating tools of the friction stir welding device are disposed on each side of the material to be joined, that is, the first electrical steel strip and the second electrical steel strip (hereinafter also simply referred to as the material to be joined). The heating device is disposed in front of the rotating tools in the joining direction on at least one side of the material to be joined. The rotating tool disposed on the front side of (vertically above) the material to be joined may be referred to as the front side rotating tool, and the rotating tool disposed on the back side of (vertically below) the material to be joined may be referred to as the back side rotating tool. Further, the heating device disposed on the front side of (vertically above) the material to be joined may be referred to as the front side heating device, and the heating device disposed on the back side of (vertically below) the material to be joined may be referred to as the back side heating device. The first electrical steel strip and the second electrical steel strip are disposed parallel to a joining center line illustrated in the drawings, and are each gripped by the gripping device.

Here, the joining center line is a line that connects set (aimed) passing positions of the axis of rotation of the rotating tool (on the surface of the material to be joined) during joining, and is parallel to the joining direction. The joining center line can also be a track of the axis of rotation of the rotating tool (on the surface of the material to be joined) during joining, and usually passes through the center position of the joined portion in the width direction. In the case of butt joining, the position is, for example, the center position in the perpendicular-to-joining direction of the butted portion including an end (trailing end) of the first electrical steel strip and an end (leading end) of the second electrical steel strip, as illustrated in FIG. 1A to 1D. In other words, the position is the midpoint between an end (trailing end) of the first electrical steel strip and an end (leading end) of the second electrical steel strip in the perpendicular-to-joining direction. In the case of lap joining, the position is, for example, the center position of the width (width in the perpendicular-to-joining direction) of the overlapped portion including an end (trailing end) of the first electrical steel strip and an end (leading end) of the second electrical steel strip.

Then, the unjoined portion (the region to be joined) of the material to be joined on the joining center line, that is, the butted portion including an end (trailing end) of the first electrical steel strip and an end (leading end) of the second electrical steel strip is preheated. Next, the rotating tools are pressed into the unjoined portion of the preheated material to be joined from both sides while rotating in opposite directions. In this state, the rotating tools are moved in the joining direction. This softens the material to be joined due to heat input to the material to be joined by the preheating and frictional heat between the material to be joined and the rotating tools. The softened site is then stirred by the rotating tools to generate plastic flow to join the material to be joined, that is, the first electrical steel strip and the second electrical steel strip. In particular, preheating the material to be joined facilitates softening of the unjoined portion and stirring by the rotating tools. As a result, the joining speed can be increased while effectively suppressing the occurrence of coil joint fractures and defects in a production line, and a high work efficiency can be achieved. In the portion where the joining is completed, the joined portion is formed. Further, the thermo-mechanically affected zone is formed adjacent to the joined portion.

The preheating and joining processes of the electrical steel strip friction stir welding method according to an embodiment of the present disclosure are described in detail below.

[Preheating Process]

In the preheating process, the heating device is disposed in front of the rotating tool in the joining traveling direction on at least one side of the material to be joined, and the unjoined portion of the material to be joined is preheated by the heating device. By moving the heating device in conjunction with the rotating tool in the joining direction, the preheating process and the joining process described below can be performed continuously. Further, preheating the material to be joined facilitates softening of the unjoined portion and stirring by the rotating tools. As a result, the joining speed can be increased while effectively suppressing the occurrence of coil joint fractures and defects in a production line, and a high work efficiency can be achieved. Further, even if the joining speed is increased, it is possible to obtain excellent rotating tool durability (extend service life of the rotating tool).

The following explains preferable preheating temperature and other factors using FIG. 1C as an example of a case where the heating device is disposed on both sides of the material to be joined (hereinafter referred to as double-sided disposition). Here, the preheating temperature of the material to be joined is the temperature at the surface of the material to be joined (surface temperature, not internal temperature) at the end of preheating (when the heating device passes through the material). The preheating temperature of the material to be joined preferably satisfies the following requirements on both sides of the material to be joined. The same effect can be obtained when the heating device is disposed on only one side of the material to be joined (hereinafter referred to as one-sided disposition), as long as the preheating temperature of the material to be joined satisfies the following requirements on both sides of the material to be joined. For this reason, description of an example of one-sided disposition is omitted.

$$100 \leq TP_{W=0} \leq 1000 \quad (11)$$

$$100 \leq TP_{W=0.2D} \leq 1000 \quad (12)$$

$$50 \leq TP_{W=0.5D} \leq 800 \quad (13)$$

In preheated double-sided friction stir welding, it is important to soften the material to be joined and facilitate stirring by the rotating tools due to heat input to the material to be joined by preheating and frictional heat between the material to be joined and the rotating tools. To achieve this, it is effective to appropriately control the preheating temperatures in the preheating region I (region where $0 \leq W \leq 0.1 \times D$ on the surface of the material to be joined) and the preheating region H (region where $0.1 \times D < W \leq 0.5 \times D$ on the surface of the material to be joined) illustrated in FIG. 1C, especially the preheating temperature of the material to be joined at positions where W=0, 0.2×D, and 0.5×D, which are representative positions of these heating regions. From this viewpoint, it is preferable to control the preheating temperature of the material to be joined so that it satisfies the relationships of the Expressions (11) to (13) above. Here, W is the distance (mm) separated from the joining center line of the material to be joined in the perpendicular-to-joining direction, and $TP_{W=0}$, $TP_{W=0.2D}$ and $TP_{W=0.5D}$ are the preheating temperatures (C) at the surface of the material to be joined at the positions where W=0, 0.2×D, and 0.5×D, respectively. Further, D is the diameter (mm) of the shoulder of the rotating tool. The preheating region is a surface region of the material to be joined to be preheated by the heating device.

$$0.70 \leq TP_{W=0.2D}/TP_{W=0} \leq 1.00 \quad (14)$$

$$TP_{W=0.5D}/TP_{W=0} \leq 0.45 \quad (15)$$

In the preheating process, the preheating temperature of the material to be joined more preferably satisfies the relationships of the Expressions (14) and (15) above, in addition to satisfying the relationships of the Expressions (11) to (13) above. In other words, in order to obtain the effect of promoting plastic flow by preheating, it is effective to increase the preheating temperature of the material to be joined. However, if the preheating temperature of the material to be joined is excessively high, microstructure alteration may occur in the vicinity of the preheating region. Therefore, it is more effective to increase the preheating temperature in the preheating region I near the joining center line while suppressing the preheating temperature in the preheating region H away from the joining center line. In particular, it is effective to control the preheating temperature of the material to be joined at positions where W=0, 0.2×D, and 0.5×D, which are representative positions of the preheating region I and preheating region H, so that $TP_{W=0.2D}/TP_{W=0}$ that is ratio of $TP_{W=0.2D}$ to $TP_{W=0}$ is in a range of 0.70 to 1.00, and $TP_{W=0.5D}/TP_{W=0}$ that is ratio of $TP_{W=0.5D}$ to $TP_{W=0}$ is 0.45 or less. Therefore, in the preheating process, the preheating temperature of the material to be joined more preferably satisfies the relationships of the Expressions (14) and (15) above.

The heating device used in the preheating process is not particularly limited, and examples thereof include a high-frequency induction heating device and a laser irradiation heating device.

When a high-frequency induction heating device is used as the heating device, for example, the operating frequency is adjusted within a range of 20 kHz or more and 360 kHz or less and the output is adjusted within a range of 10 kW or more and 200 kW or less, respectively. This allows the surface temperature of the material to be joined to satisfy the relationships of the Expressions (11) to (15) above.

When a laser irradiation heating device is used as the heating device, for example, the laser beam wavelength is adjusted within a range of 0.3 µm or more and 11 µm or less and the output is adjusted within a range of 2 kW or more and 50 kW or less, respectively. This allows the surface temperature of the material to be joined to satisfy the relationships of the Expressions (11) to (15) above.

A device that combines multiple types of heating devices, such as a device that combines a high-frequency induction heating device and a laser irradiation heating device, may be used as the heating device.

The distance between the heating device and the rotating tool and the area of the preheating region (hereinafter also referred to as preheating area) are not particularly limited as long as the heating device is disposed in front of the rotating tool in the joining (traveling) direction on at least one side of the material to be joined. However, if the distance between the heating device and the rotating tool becomes too small, the rotating tool may be damaged by heat from the heating device. Therefore, the positional relationship between the heating device and the rotating tool is preferably determined in consideration of heating efficiency and the influence on the material to be joined. For example, in the example of using a high-frequency induction heating device with an operating frequency of 20 kHz to 360 kHz, the distance between the heating device and the rotating tool (distance between the ends in the joining direction) is preferably in a range of 1 mm to 100 mm. The preheating area is not particularly limited, but from the viewpoint of satisfying the relationships of the Expressions (11) to (15) above, the center position of the preheating area in the perpendicular-to-joining direction is preferably in a range of $0 \leq W \leq 0.1 \times D$. The preheating area can be controlled, for example, by adjusting the arrangement, output and frequency of the heating device.

[Joining Process]

After preheating the unjoined portion of the material to be joined in the preheating process, the rotating tools are pressed into the unjoined portion of the material to be joined from both sides while rotating in opposite directions. In this state, the rotating tools are then moved in the joining direction to join the material to be joined, that is, the first electrical steel strip and the second electrical steel strip.

Further, in the joining process, it is important that:
the diameter D (mm) of the shoulders of the rotating tools satisfies the relationship of the above Expression (7), and
the rotation speed RS (r/min) of the rotating tools, the diameter D (mm) of the shoulders of the rotating tools, and the joining speed JS (mm/min), expressed as $RS \times D^3/JS$, satisfy the relationship of the above Expression (8).

As a result, even when electrical steel strips are used as the material to be joined, mechanical properties of the coil joint are improved without causing deterioration of the shape of the coil joint, and the occurrence of coil joint fractures in a production line is effectively inhibited.

In other words, the diameter D of the shoulders of the rotating tools (hereinafter also simply referred to as shoulder diameter D) is appropriately controlled according to the thickness of the unjoined portion. This effectively imparts to the material to be joined, that is, the first electrical steel strip and the second electrical steel strip, a temperature increase due to frictional heat generated between the rotating tools and the material to be joined, and a shear stress due to frictional force. Here, when the shoulder diameter D is less than 4×TJ (mm), sufficient plastic flow might not be obtained. On the other hand, when the shoulder diameter D exceeds 10×TJ (mm), the region where plastic flow occurs is unnecessarily expanded, and an excessive amount of heat is injected into the joined portion. This leads to coarsening of the recrystallized microstructure of the joined portion. Therefore, the relationship of the above Expression (7) is satisfied for the shoulder diameter D. The shoulder diameter D is preferably 5×TJ (mm) or more. The shoulder diameter D is preferably 9×TJ (mm) or less.

Figure 3:
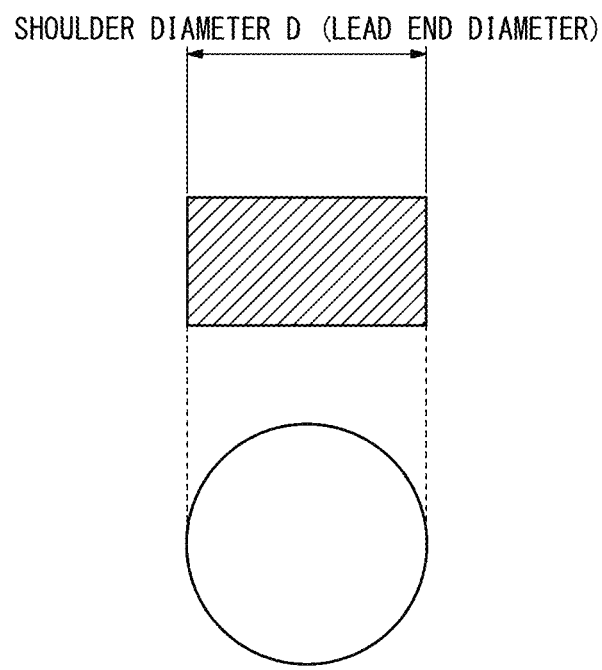
FIG. 3 is a schematic diagram illustrating an example of shape of a rotating tool without a probe (flat-end rotating tool) used in an electrical steel strip friction stir welding method according to an embodiment of the present disclosure.
Figure 4:
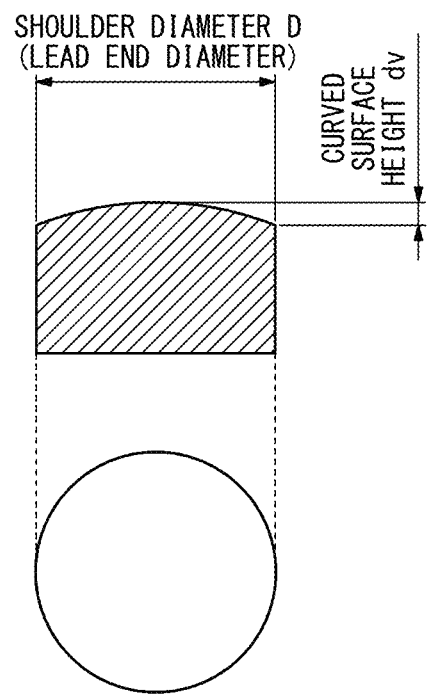
FIG. 4 is a schematic diagram illustrating an example of shape of a rotating tool without a probe (convex-end rotating tool) used in an electrical steel strip friction stir welding method according to an embodiment of the present disclosure.
Figure 5:
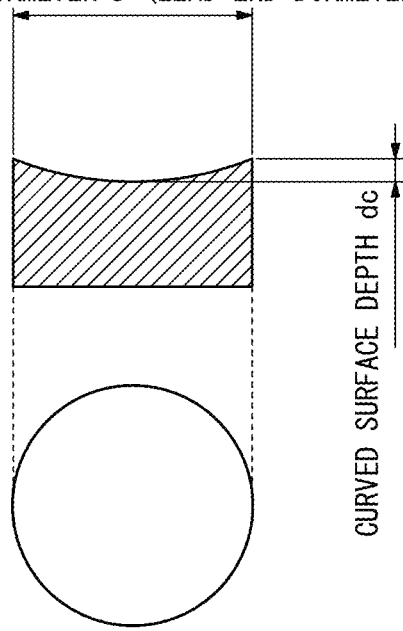
FIG. 5 is a schematic diagram illustrating an example of shape of a rotating tool without a probe (concave-end rotating tool) used in an electrical steel strip friction stir welding method according to an embodiment of the present disclosure.

In the case of a rotating tool without a probe, the shoulder diameter D may be a leading end diameter, as illustrated in FIG. 3 to FIG. 5. The leading end diameter is the diameter of the leading end face of the rotating tool in the plane perpendicular to the axis of rotation (the diameter of the projected area when the leading end face of the rotating tool is projected in the direction parallel to the axis of rotation).

Further, RS×D³/JS is a parameter that correlates with the amount of heat generated per unit joint length. By setting the range of RS×D³/JS from 180×TJ to 1500×TJ, the temperature rise due to the frictional heat generated between the rotating tools and the material to be joined and the shear stress due to the frictional force may be effectively imparted to the material to be joined, that is, the first electrical steel strip and the second electrical steel strip. Here, when RS×D³/JS is less than 180×TJ, the amount of heat generated may be insufficient. Therefore, forming a joining interface in a metallurgically joined state at mating surfaces of the first electrical steel strip and the second electrical steel strip may become difficult. On the other hand, when RS×D³/JS exceeds 1500×TJ, the amount of heat generated by friction stirring becomes excessive, and an excessive amount of heat is injected into the joined portion. This increases the peak temperature (the maximum arrival temperature) and decreases the cooling rate of the joined portion, which leads to coarsening of the recrystallized microstructure of the joined portion. Therefore, from the viewpoint of satisfying the predetermined relationship, the relationship of the above Expression (8) is satisfied for RS×D³/JS. RS×D³/JS is more preferably 240×TJ or more. RS×D³/JS is more preferably 1200×TJ or less.

When the rotation speeds RS and/or the shoulder diameters D of the rotating tools are different between the front side rotating tool and the back side rotating tool, the relationships of the above Expressions (7) and (8) are preferably satisfied for the front side rotating tool and the back side rotating tool, respectively.

In the electrical steel strip friction stir welding method according to an embodiment of the present disclosure, it is preferred that the joining is performed under conditions that the steel microstructures of the joined portion and the thermo-mechanically affected zone formed by the joining of the first electrical steel strip and the second electrical steel strip respectively become mainly ferrite phase and the relationships of the following Expressions (1) to (4) are satisfied. As a result, even when electrical steel strips are used as the material to be joined, mechanical properties of the coil joint are improved without causing deterioration of the shape of the coil joint, and the occurrence of coil joint fractures in a production line is more effectively inhibited.

$$Dsz \leq 200 \ \mu m \tag{1}$$

$$Dhaz1 \leq Dbm1 \tag{2}$$

$$Dhaz2 \leq Dbm2 \tag{3}$$

$$0.9 \times (Hbm1 + Hbm2)/2 \leq Hsz \leq 1.2 \times (Hbm1 + Hbm2)/2 \tag{4}$$

Here,
Dsz is the average value (μm) of ferrite grain size of the joined portion,
Dhaz1 is the average value (μm) of ferrite grain size of the thermo-mechanically affected zone on the first electrical steel strip side,
Dhaz2 is the average value (μm) of ferrite grain size of the thermo-mechanically affected zone on the second electrical steel strip side,
Dbm1 is the average value (μm) of ferrite grain size of the base metal portion of the first electrical steel strip,
Dbm2 is the average value (μm) of ferrite grain size of the base metal portion of the second electrical steel strip,
Hsz is the average value of hardness of the joined portion,
Hbm1 is the average value of hardness of the base metal portion of the first electrical steel strip, and
Hbm2 is the average value of hardness of the base metal portion of the second electrical steel strip.

Further, in the electrical steel strip friction stir welding method according to an embodiment of the present disclosure, the joining is preferably performed under conditions satisfying the relationships of the following Expressions (5) and (6).

$$0.8 \times TbmL \leq TszL \tag{5}$$

$$TszH \leq 1.3 \times TbmH \tag{6}$$

Here,
TszL is the minimum value (mm) of the thickness of the joined portion,
TszH is the maximum value (mm) of the thickness of the joined portion, TbmL is the thickness (mm) of the thinner of the first electrical steel strip and the second electrical steel strip, and
TbmH is the thickness (mm) of the thicker of the first electrical steel strip and the second electrical steel strip.

When the thicknesses of the first electrical steel strip and the second electrical steel strip are the same, TbmL=TbmH.

Description of the material to be joined (the first electrical steel strip and the second electrical steel strip), the joined portion, the thermo-mechanically affected zone, Expressions (1) to (6), and the like, is provided under section [2] Electrical steel strip welded joint, below.

Further, in the electrical steel strip friction stir welding method according to an embodiment of the present disclosure, the gap G (mm) between the shoulders of the rotating tools preferably satisfies the relationship of the following Expression (9).

$$0.4 \times TJ \leq G \leq 0.9 \times TJ \tag{9}$$

In other words, in double-sided friction stir welding, appropriately controlling the gap G between the shoulders of the rotating tools (hereinafter also simply referred to as shoulder gap G) is advantageous from the viewpoint of achieving a high joining speed while inhibiting defect occurrence during joining. The shoulder gap G may be said to be the separation distance in the thickness direction between the shoulder of the front side rotating tool and the shoulder of the back side rotating tool. In particular, when the shoulder gap G is within the range of 0.4×TJ to 0.9×TJ, the shoulders of the rotating tools facing each other are pushed into the front side and the back side of the material to be joined with sufficient load to sufficiently promote heat generation and plastic flow in the thickness direction at the joined portion. This leads to a better state of welded joint. On the other hand, when the shoulder gap G exceeds 0.9×TJ, the shoulders of the rotating tools may not be pushed into the front side and the back side of the material to be joined with sufficient load, and the above effect may not be achieved. When the shoulder gap G is less than 0.4×TJ, the front side and the back side of the joined portion may become excessively concave, which may adversely affect joint strength. Therefore, the shoulder gap G is preferably in the range of 0.4×TJ to 0.9×TJ. The shoulder gap G is more preferably 0.5×TJ or more. The shoulder gap G is more preferably 0.8×TJ or less.

In the electrical steel strip friction stir welding method according to an embodiment of the present disclosure, the tilt angle $\alpha$ of the rotating tools is not particularly limited, and for example, it preferably satisfies the relationship of the following Expression (10) for both the front side rotating tool and the back side rotating tool.

$$0° \le \alpha \le 4° \quad (10)$$

Here, $\alpha$ is the tilt angle of the axis of rotation of the rotating tool (hereinafter also referred to as tool rotation axis) from the thickness direction (direction perpendicular to the surface of the material to be joined) in a plane including the joining direction and the thickness direction (direction perpendicular to the surface of the material to be joined). The direction (angle) in which the lead end of the rotating tool leads the joining direction is +.

For rotating tools with probes that are commonly used in double-sided friction stir welding method, it is more preferable to tilt the tool rotation axis in both the front side rotating tool and the back side rotating tool, that is, 0°<$\alpha$. This allows the leading end of the probe to lead the joining direction, so that the load on the rotating tool may be received by the rotating tool as a compressive force in the direction of the axis of rotation. This reduces force in the bending direction and helps avoid destruction of the rotating tool. Therefore, when using a rotating tool with a probe, it is more preferably 0°<$\alpha$. It is more preferably $\alpha \le 2°$.

On the other hand, a rotating tool without a probe does not need to consider destruction due to local stress concentration on the probe. Therefore, it is more preferable for both the front side rotating tool and the back side rotating tool to have a tilt angle $\alpha$ of the rotating tools of 0°, that is, to have the tool rotation axis be parallel to the thickness direction in a plane including the joining direction and the thickness direction (direction perpendicular to the surface of the material to be joined). This results in a concave on the front and back surfaces of the joined portion and decreases a ratio of the thickness of the joined portion to the thickness of the material to be joined. As a result, the tendency to adversely affect joint strength can be avoided. There are also advantages such that a control mechanism of a device for providing and setting a tilt angle $\alpha$ of the rotating tools can be omitted. A tilt angle $\alpha$ of the rotating tools of ±0.3° is acceptable.

Conditions other than the above are not particularly limited as long as conditions satisfy the relationships of the above Expressions (7) and (8) and preferably satisfy the relationships of the above Expressions (1) to (6), (9) and (10), and may be in accordance with conventional methods.

For example, the rotation speed of the rotating tools is preferably 200 r/min to 6000 r/min. Keeping the rotation speed of the rotating tools in this range inhibits degradation of mechanical properties due to excessive heat input while maintaining a good surface profile, and is therefore advantageous. The rotation speed of the rotating tools is more preferably 300 r/min or more. The rotation speed of the rotating tools is more preferably 5000 r/min or less.

The joining speed is preferably 1000 mm/min to 10000 mm/min. The joining speed is more preferably 2000 mm/min or more, still more preferably 3500 mm/min or more, even more preferably 4000 mm/min or more, and even more preferably 5000 mm/min or more.

The positions of the lead ends of the rotating tools, indentation load, rotation torque, gap between probes, and the like may be set according to conventional methods.

As illustrated in FIG. 1A to FIG. 1D, in the preheated double-sided friction stir welding, the direction of rotation of the front side rotating tool and the direction of rotation of the back side rotating tool are preferably opposed when viewed from the front (or back) side of the material to be joined. The rotation speed of the front side rotating tool is preferably the same as the rotation speed of the back side rotating tool. This allows the rotation torques applied to the material to be joined from the front side rotating tool and the back side rotating tool to cancel each other out. As a result, the structure of the jig that holds the material to be joined may be simplified compared to the one-sided friction stir welding method, in which the unjoined portion is pressed from one side.

Further, when the rotation direction of the front side rotating tool and the rotation direction of the back side rotating tool are in the same direction as viewed from the front (or back) side of the material to be joined, the relative speed of one rotating tool to the other approaches zero. As a result, the plastic flow of the material to be joined approaches a homogeneous state and plastic deformation is reduced. Therefore, achieving a good joined state is difficult because heat generation due to plastic deformation of the material is also not obtained. Therefore, from the viewpoint of uniformly obtaining sufficient temperature increase and shear stress in the thickness direction of the material to be joined to achieve a good joined state, it is preferable to make the direction of rotation of the front side rotating tool and the direction of rotation of the back side rotating tool opposed when viewed from the front (or back) side of the material to be joined.

Further, the rotating tools used in the electrical steel strip friction stir welding method according to an embodiment of the present disclosure are also not particularly limited, as long as the relationship of the above Expression (7) is satisfied, and may be in accordance with conventional methods.

For example, the lead ends of the rotating tools are in contact with the material to be joined, that is, the first electrical steel strip and the second electrical steel strip, during joining. Accordingly, the lead ends of the rotating tools are made of a harder material than the first electrical steel strip and the second electrical steel strip under the high temperature conditions during joining." This allows the rotating tools to apply deformation to the first electrical steel strip and the second electrical steel strip while maintaining the shape of the lead ends during joining. As a result, high stirring capacity is continuously achievable, enabling proper joining. The hardness of the lead ends of the rotating tools, the first electrical steel strip, and the second electrical steel strip may be measured and compared by a high temperature Vickers hardness test. It may suffice that only the lead ends of the rotating tools are made of a material harder than the first electrical steel strip and the second electrical steel strip. Alternatively, the rotating tools may entirely be made of a material harder than the first electrical steel strip and the second electrical steel strip.

Figure 2A:
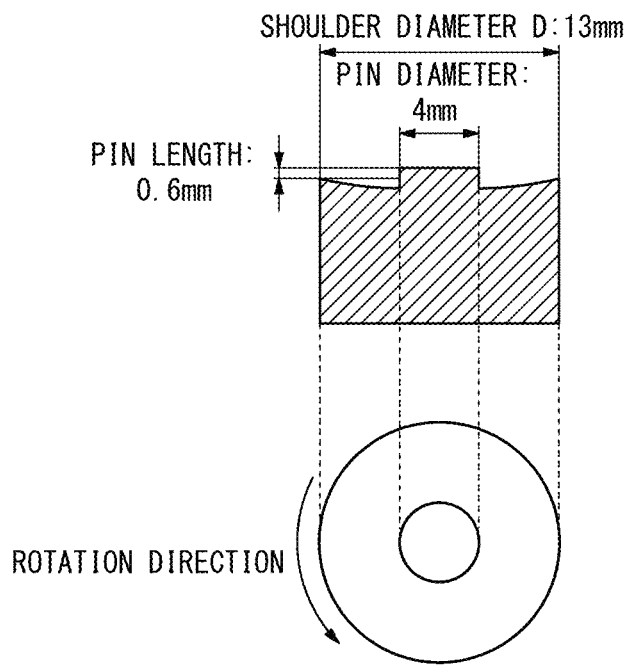
FIG. 2A is a schematic diagram illustrating an example of shape of a rotating tool with a probe used in an electrical steel strip friction stir welding method according to an embodiment of the present disclosure.
Figure 2B:
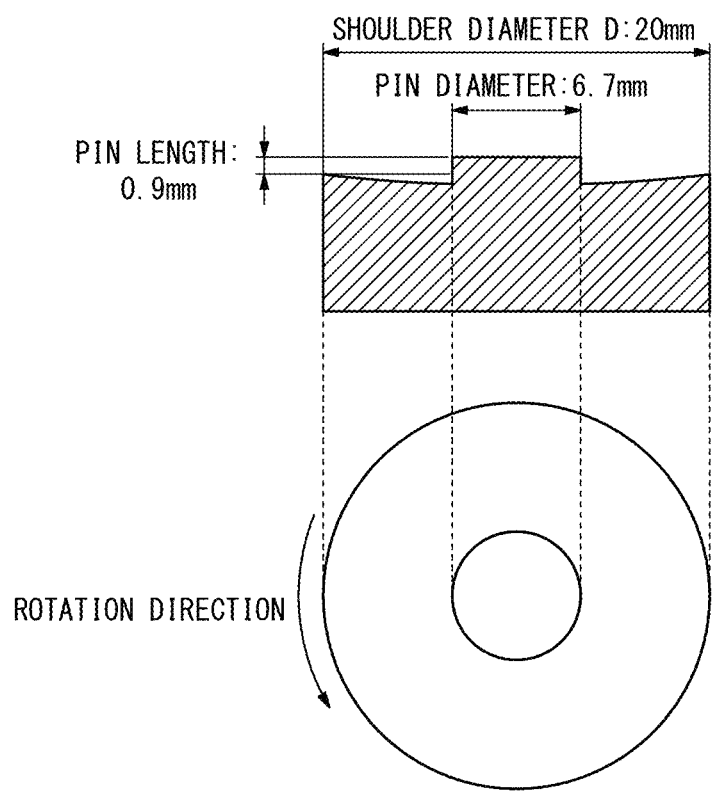
FIG. 2B is a schematic diagram illustrating an example of shape of a rotating tool with a probe used in an electrical steel strip friction stir welding method according to an embodiment of the present disclosure.

FIG. 2A and FIG. 2B illustrate examples of rotating tools with probes. As illustrated in FIG. 2A and FIG. 2B, the lead ends of the rotating tools with probes each include a shoulder (the range indicated by the shoulder diameter in the drawings) and a probe (the range indicated by the pin diameter in the drawings) disposed on the shoulder and sharing the axis of rotation with the shoulder.

In the rotating tool example illustrated in FIG. 2A, the rotating tool has shoulder diameter D: 13 mm, pin diameter: 4 mm, pin length: 0.6 mm, and concavity depth (not labelled): 0.3 mm.

In the rotating tool example illustrated in FIG. 2B, the rotating tool has shoulder diameter D: 20 mm, pin diameter: 6.7 mm, pin length: 0.9 mm, and concavity depth (not labelled): 0.3 mm.

In the rotating tool with a probe, the shoulder presents a flat shape formed by a substantially flat or gently curved surface. The shoulder functions to generate frictional heat through contact with the first electrical steel strip and the second electrical steel strip while rotating during joining. Further, the shoulder functions to press on the heat-softened region to prevent material from separating and to promote plastic flow in the direction of rotation.

The probe is a discontinuous shape with the shoulder and protrudes substantially perpendicularly toward the material to be joined (not illustrated). The probe functions to improve the stirring capacity in the vicinity of the mid-thickness part by penetrating in the mid-thickness direction of the softened portions of the first electrical steel strip and the second electrical steel strip during joining. Further, the probe is typically located in the center of the shoulder.

For the shoulder diameter D (mm), the relationship of the above Expression (7) is satisfied, as described above. Further, the pin diameter and the pin length of each of the rotating tools are not particularly limited, and may be set as needed in accordance with conventional methods. For example, when butt-joining the first electrical steel strip and the second electrical steel strip having different thicknesses, an average thickness of the first electrical steel strip and the second electrical steel strip may be considered and the pin diameter, the pin length, and the like of the rotating tools may be set according to conventional methods. Further, when overlap joining the first electrical steel strip and the second electrical steel strip, the total thickness of the first electrical steel strip and the second electrical steel strip may be considered and the pin diameter, the pin length, and the like of the rotating tools may be set according to conventional methods.

Further, as mentioned above, the probe functions to improve the stirring capacity in the vicinity of the mid-thickness part by penetrating in the mid-thickness direction of the softened portions of the first electrical steel strip and the second electrical steel strip during joining. However, the probe is subjected to greater stress than the shoulder. In this regard, in the electrical steel strip friction stir welding method according to an embodiment of the present disclosure, the preheated double-sided friction stir welding is applied as the joining method, and the relationships of the above Expressions (7) and (8) are both satisfied, which further enhances the stirring function. Accordingly, use of a rotating tool without a probe is possible. Rotating tools without probes are more durable than rotating tools with probes. Therefore, use of rotating tools without probes is preferable in terms of durability and extended service life of the rotating tools, and thus in reducing joint failure rates (failures caused by wear and breakage of the rotating tools).

FIG. 3 to FIG. 5 illustrate examples of rotating tools without probes. FIG. 3 illustrates an example of a rotating tool without a probe that has a flat leading end (hereinafter also referred to as a flat-end rotating tool). FIG. 4 illustrates an example of a rotating tool without a probe that has a convex curved leading end (hereinafter also referred to as a convex-end rotating tool). FIG. 5 illustrates an example of a rotating tool without a probe that has a concave curved leading end (hereinafter also referred to as a concave-end rotating tool).

As illustrated in FIG. 3 to FIG. 5, the lead end of a rotating tool without a probe consists only of a shoulder. In other words, the lead end of the rotating tool without a probe does not have a portion (probe) protruding substantially perpendicularly toward the material to be joined that forms a discontinuous shape with the shoulder. The leading end of the rotating tool is preferably, for example, a flat surface as illustrated in FIG. 3, a convex curved surface as illustrated in FIG. 4, or a concave curved surface as illustrated in FIG. 5. Further, the shape of the lead end in the plane perpendicular to the tool rotation axis (the projected area when the leading end face of the rotating tool is projected in the direction parallel to the axis of rotation) is circular.

In a flat-end rotating tool as illustrated in FIG. 3, for example, the leading end in contact with the material to be joined consists of one plane perpendicular to the tool rotation axis.

In a convex-end rotating tool as illustrated in FIG. 4, for example, the leading end in contact with the material to be joined has a continuous shape with no probe and a substantially uniformly sloped surface. More specifically, the leading end constitutes a single curved surface (paraboloid, prolate spherical, or spherical) projecting from the periphery toward the center. Further, as illustrated in FIG. 4, a cross section of the leading end (cross section including and parallel to the axis of rotation) has a curved shape with a substantially uniform curvature radius. In addition, the relationship of the following Expression (16) is preferably satisfied for the curved surface height dv (mm) and the shoulder diameter D (mm).

$$dv/D \leq 0.06 \tag{16}$$

In other words, by setting dv/D to 0.06 or less, pressure may be applied more effectively to a flow zone when the lead end of the rotating tool contacts the material to be joined, and plastic flow may be generated more effectively. On the other hand, when dv/D exceeds 0.06, the front surface and the back surface of the joined portion may become excessively concave, and the thickness of the joined portion may become small relative to the thickness of the steel strip. In such cases, ensuring joint strength becomes difficult, which is undesirable. A lower limit of dv/D is not particularly limited. From the viewpoint of applying pressure more effectively to the flow zone, dv/D is preferably 0.01 or more.

In a concave-end rotating tool as illustrated in FIG. 5, the leading end in contact with the material to be joined has a continuous shape with no probe and a substantially uniformly sloped surface. More specifically, the leading end constitutes a single curved surface (paraboloid, prolate spherical, or spherical) recessing from the periphery toward the center. Further, as illustrated in FIG. 5, a cross section of the leading end (cross section including and parallel to the axis of rotation) has a curved shape with a substantially uniform curvature radius. In addition, the relationship of the following Expression (17) is preferably satisfied for the curved surface depth dc (mm) and the shoulder diameter D (mm).

$$dc/D \le 0.03 \qquad (17)$$

By setting dc/D to 0.03 or less, softened metal fills the concave curved surface of the lead end during joining. Accordingly, pressure may be applied more effectively to the flow zone when the lead end of the rotating tool contacts the material to be joined, and plastic flow may be generated more effectively. On the other hand, when dc/D exceeds 0.03, effectively applying pressure to the flow zone to generate sufficient plastic flow may be difficult, which is not desirable. A lower limit of dc/D is not particularly limited. From the viewpoint of applying pressure more effectively to the flow zone, dv/D is preferably 0.01 or more.

Figure 6:
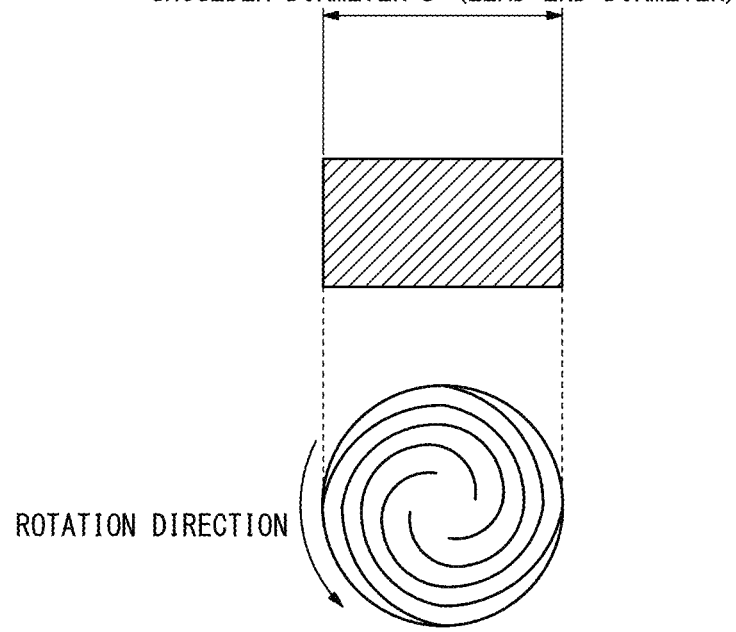
FIG. 6 is a schematic diagram illustrating an example of shape of a rotating tool without a probe (flat-end rotating tool with stepped portion) used in an electrical steel strip friction stir welding method according to an embodiment of the present disclosure.
Figure 7:
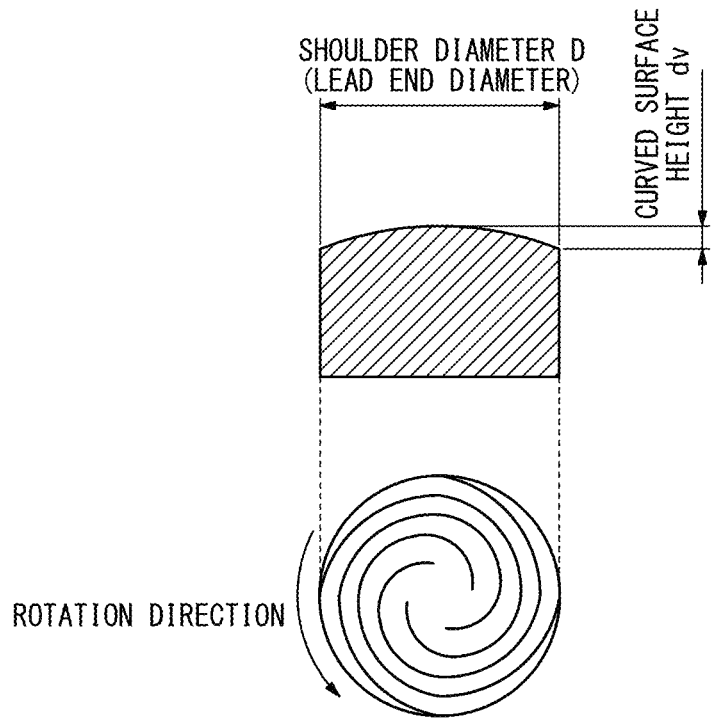
FIG. 7 is a schematic diagram illustrating an example of shape of a rotating tool without a probe (convex-end rotating tool with stepped portion) used in an electrical steel strip friction stir welding method according to an embodiment of the present disclosure.
Figure 8:
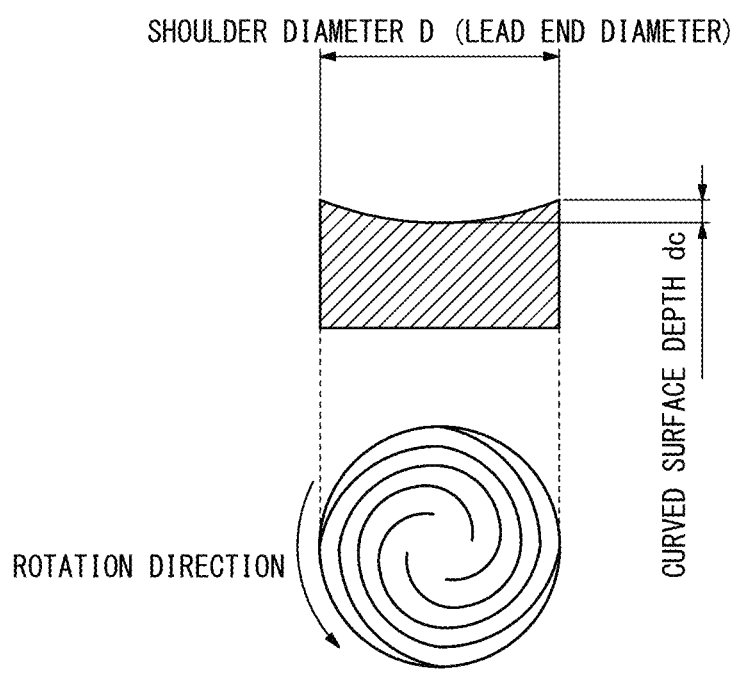
FIG. 8 is a schematic diagram illustrating an example of shape of a rotating tool without a probe (concave-end rotating tool with stepped portion) used in an electrical steel strip friction stir welding method according to an embodiment of the present disclosure.

Further, from the viewpoint of further promoting material flow, the leading end of the rotating tool preferably has a spiral-shaped (helical) stepped portion spiraling in the direction opposite rotation. The spiral-shaped stepped portion is defined, for example, by a radial curve (spiral) starting from the center of the leading end of the rotating tool or the periphery of a central circle of the leading end of the rotating tool, as illustrated in FIG. 6 to FIG. 8, and extending to the outer edge of the leading end of the rotating tool. The central circle of the leading end of the rotating tool is a circle of any diameter centered at the center of the leading end of the rotating tool. In FIG. 6 to FIG. 8, the number of spirals is four in each case.

The number of spirals defining the stepped portion may be one or more. However, when the number of spirals defining the stepped portion exceeds six, an effect of promoting material flow is lessened. Further, susceptibility to breakage is increased due increased shape complexity. Accordingly, the number of spirals defining the stepped portion is preferably six or less. FIG. 9 to FIG. 13 illustrate examples of cases where the number of spirals defining the stepped portion is from two to six.

Further, from the viewpoint of preventing damage to the lead end of the rotating tool while improving material flow, the number of spirals defining the stepped portion is preferably adjusted according to the shoulder diameter. For example, preferably, the larger the shoulder diameter, the greater the number of spirals defining the stepped portion, and the smaller the shoulder diameter, the smaller the number of spirals defining the stepped portion. Specifically, when the shoulder diameter is less than 6 mm, the number of spirals defining the stepped portion is preferably two or less. On the other hand, when the shoulder diameter is 6 mm or more, the number of spirals defining the stepped portion is preferably 3 to 6.

Figure 9:
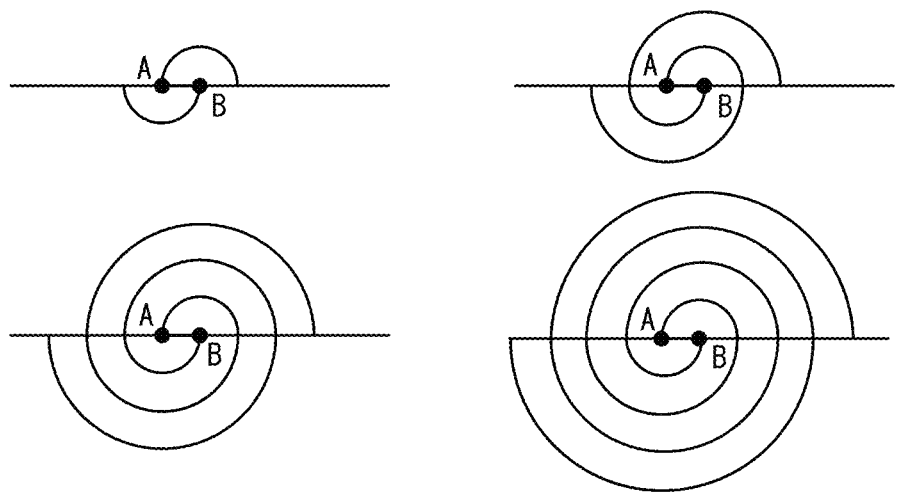
FIG. 9 is a diagram for explaining a method of arranging (depicting) spirals at equal intervals with two spirals defining a stepped portion.

When there are two spirals defining the stepped portion and the spirals are equally spaced, semicircles are drawn with the line segment A-B as radii, starting from point A and point B, respectively, as illustrated in FIG. 9. Then, semicircles having a radius twice the length of the line segment A-B are respectively drawn. Then, semicircles having a radius three times the length of the line segment A-B are respectively drawn. By repeating this process, two equally spaced spirals may be drawn.

When a number n of spirals defining the stepped portion is 3 to 6 and the spirals are equally spaced, as illustrated in FIG. 10 to FIG. 13, a regular n-gon is drawn, and with each vertex of the n-gon as a center start point, an arc with a radius equal to the length of a side of the regular n-gon is drawn to a point where the arc intersects an extension of a side. Then, using the vertex next to the previous vertex as a center, an arc of radius twice the length of the side of the regular n-gon is drawn to the point where the arc intersects the next extension of a side. Then, using the vertex next to the previous vertex as a center, an arc of radius three times the length of the side of the regular n-gon is drawn to the point where the arc intersects the next extension of a side. By repeating this process, n equally spaced spirals may be drawn.

Figure 10:
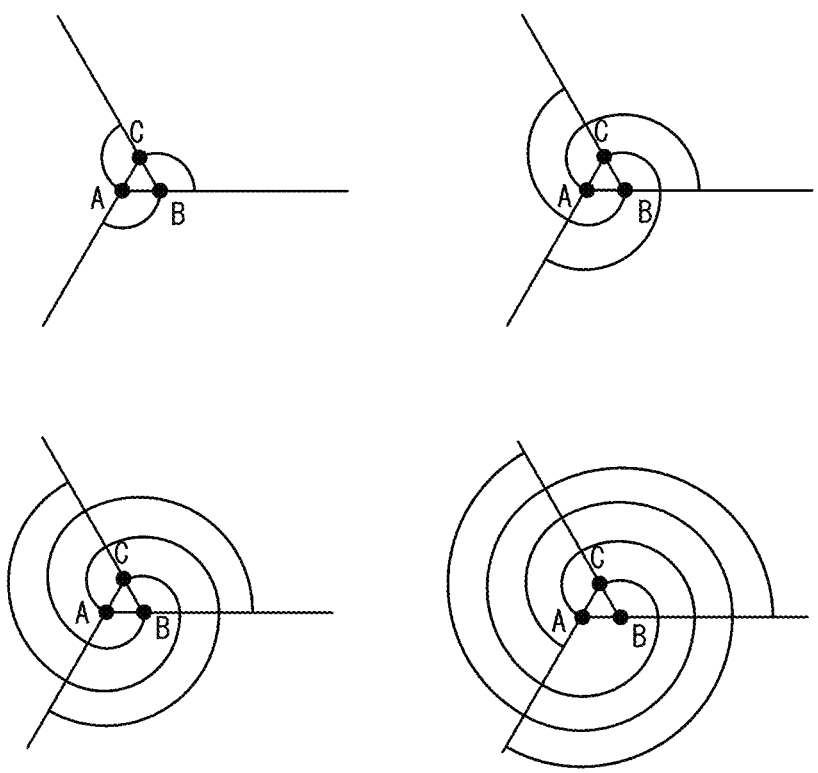
FIG. 10 is a diagram for explaining a method of arranging (depicting) spirals at equal intervals with three spirals defining a stepped portion.
Figure 11:
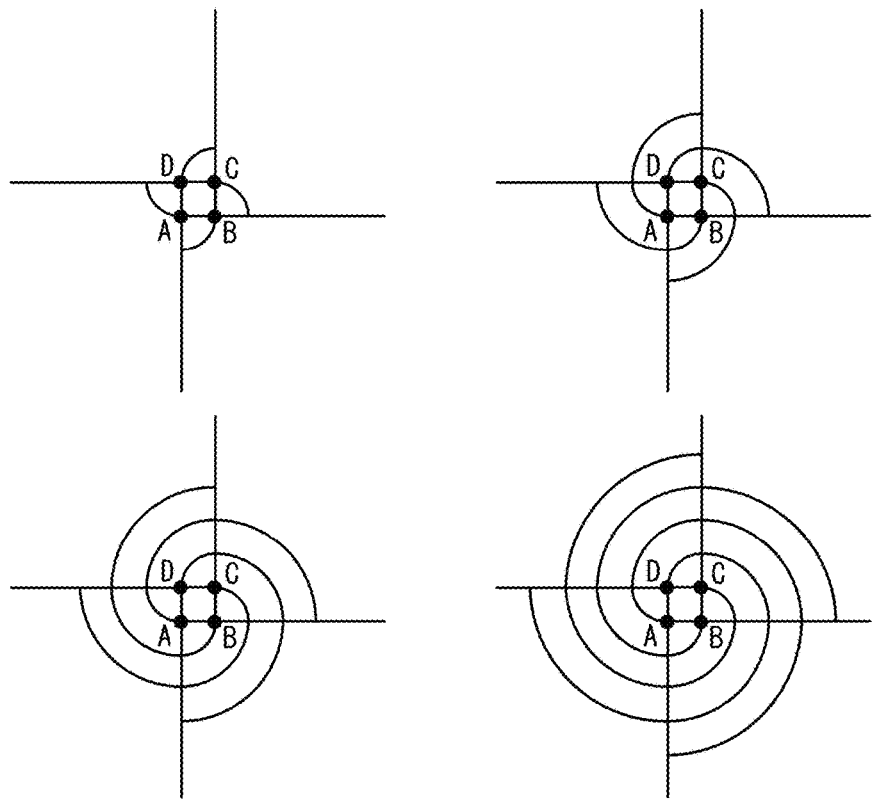
FIG. 11 is a diagram for explaining a method of arranging (depicting) spirals at equal intervals with four spirals defining a stepped portion.
Figure 12:
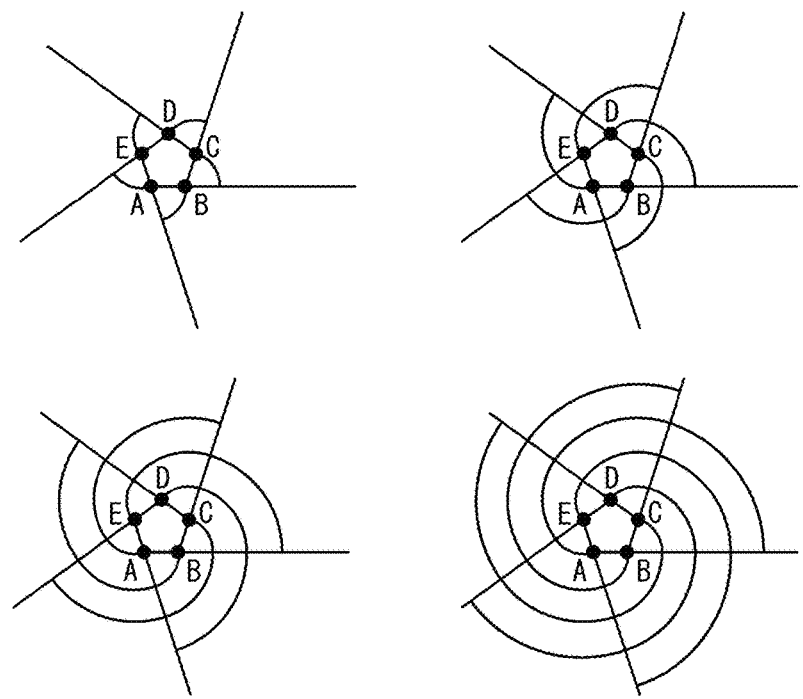
FIG. 12 is a diagram for explaining a method of arranging (depicting) spirals at equal intervals with five spirals defining a stepped portion.
Figure 13:
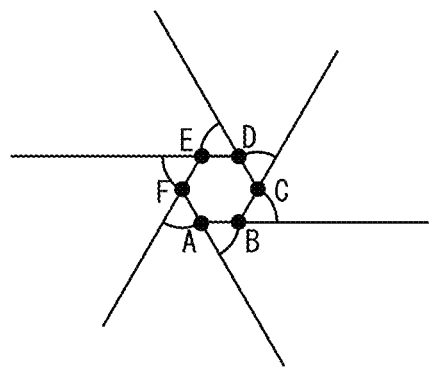
FIG. 13 is a diagram for explaining a method of arranging (depicting) spirals at equal intervals with six spirals defining a stepped portion.
Figure 13:
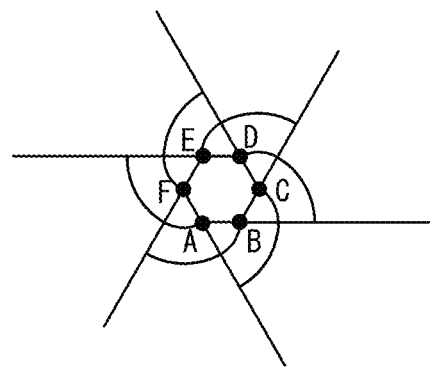
Figure 13:
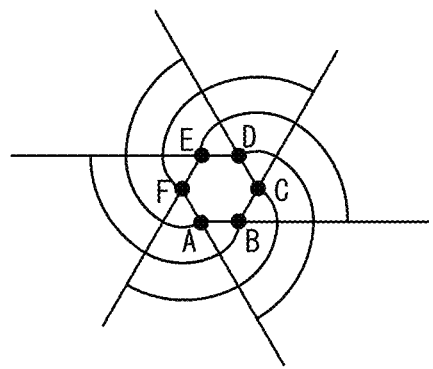
Figure 13:
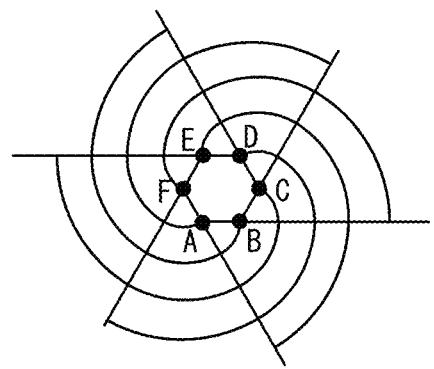

In the case of FIG. 9 to FIG. 13, the number of spirals may be one. In the case of FIG. 9, FIG. 11, and FIG. 13, the number of spirals may be two and the spirals may be equally spaced. In the case of FIG. 10 and FIG. 13, the number of spirals may be three and the spirals may be equally spaced.

In addition, the length of each spiral is preferably 0.5 circumferences of the leading end or more. The length of each spiral is preferably 2 circumferences of the leading end or less. The length of each spiral is preferably adjusted according to the shoulder diameter. For example, preferably, the larger the shoulder diameter, the longer the spiral length, and the smaller the shoulder diameter, the shorter the spiral length.

Figure 14:
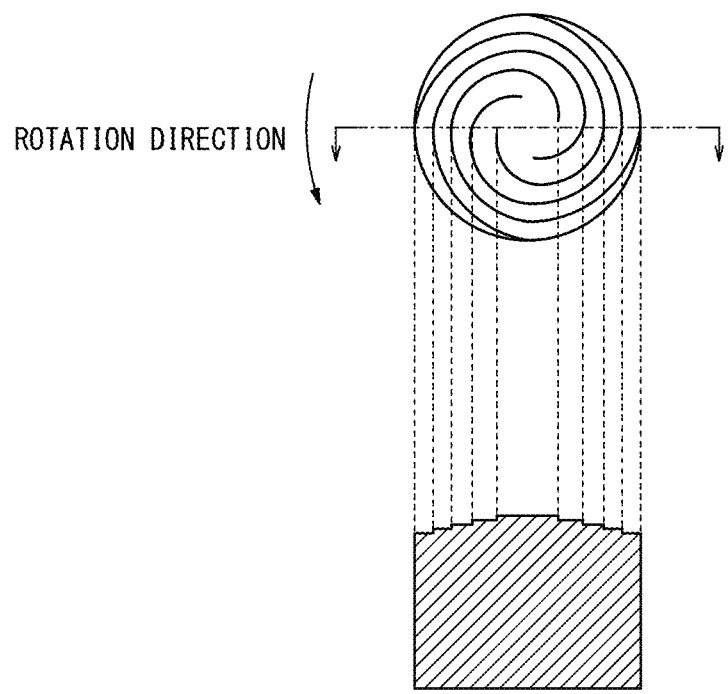
FIG. 14 is a schematic diagram illustrating an example of a convex-end rotating tool with a step-like stepped portion.

In one example of a convex-end rotating tool, the stepped portion is formed by a step-like change in height for each inter-spiral region, for example, by gradually lowering the leading end from the center to the periphery, as illustrated in FIG. 14. In the case of a concave-end rotating tool, the stepped portion is structured by gradually raising the leading end from the center to the periphery. Hereinafter, this form of the stepped portion is also referred to as step-like. The number of steps in the stepped portion is preferably one or more. Further, in a cross section including and parallel to the axis of rotation (cross section in FIG. 14), each step may be substantially horizontal, for example.

Figure 15:
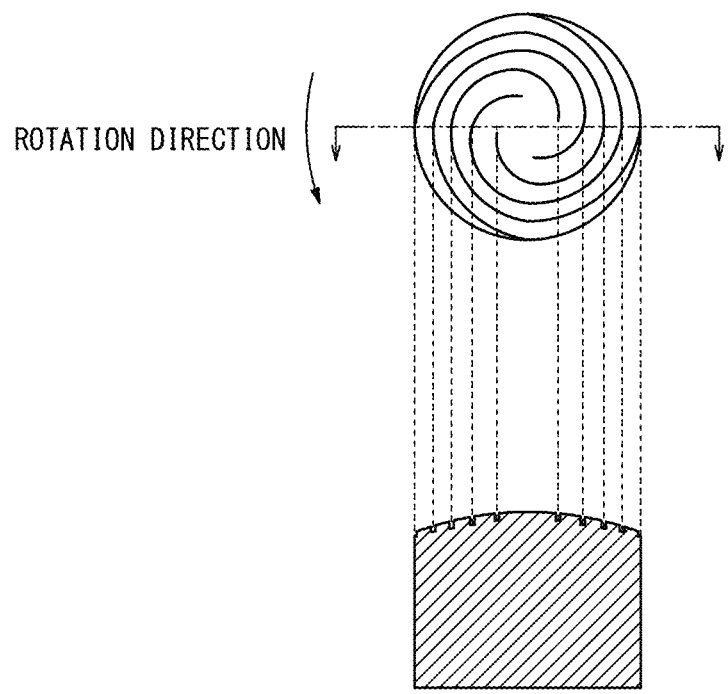
FIG. 15 is a schematic diagram illustrating an example of a convex-end rotating tool with a grooved stepped portion.

In another example of a convex-end rotating tool, the stepped portion is formed by providing a recessed region (hereinafter also referred to as a groove) recessed from the leading end at the spiral location, as illustrated in FIG. 15. This forms a stepped portion that gradually lowers from the center of the leading end toward the periphery. In the case of a concave-end rotating tool, the stepped portion is formed that gradually rises from the center of the leading end toward the periphery. Hereinafter, this form of the stepped portion is also referred to as grooved. Examples of cross section shapes of the grooves include a U shape, a V shape, and a check-mark shape. The number of steps in the stepped portion is preferably one or more.

Figure 16:
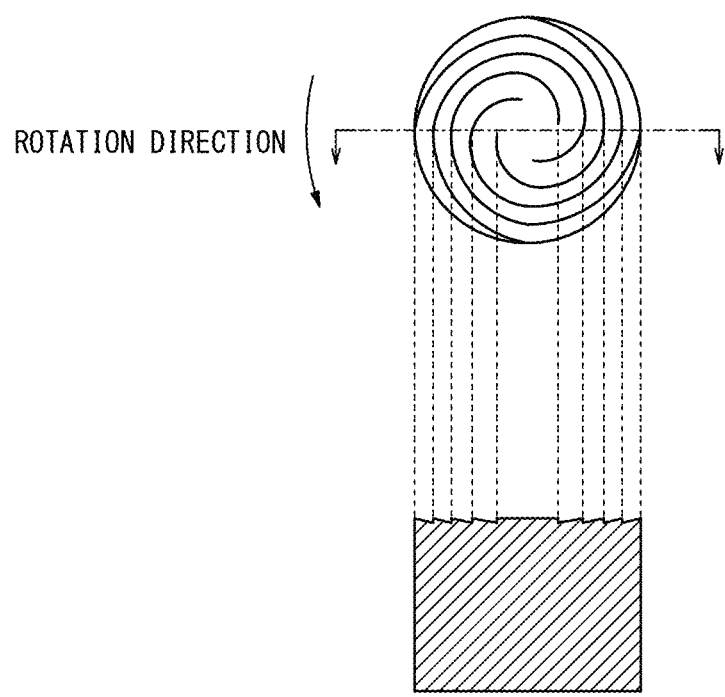
FIG. 16 is a schematic diagram illustrating an example of a flat-end rotating tool with a grooved stepped portion.

In one example of a flat-end rotating tool, the stepped portion is formed by providing a groove at the spiral location, as illustrated in FIG. 16. Examples of groove shapes include a U shape, a V shape, and a check-mark shape. The number of steps in the stepped portion is preferably one or more.

By providing the stepped portion as described above, the metal material softened by frictional heat flows from the outside to the inside of the rotating tool during pressing and stirring of the material to be joined by the rotating tool. This inhibits metal material flowing out of a pressed zone due to the rotating tool. As a result, plastic flow in the pressed zone is promoted. Further, the thickness of the joined portion may be prevented from decreasing relative to the base metal and a beautiful, burr-free joined portion surface may be formed.

A base portion on the opposite side of the rotating tool from the lead end is preferably able to be attached to commonly conventionally used double-sided friction stir welding equipment, and the shape of the base portion is not particularly restricted.

[2] Electrical Steel Strip Welded Joint

Figure 17:
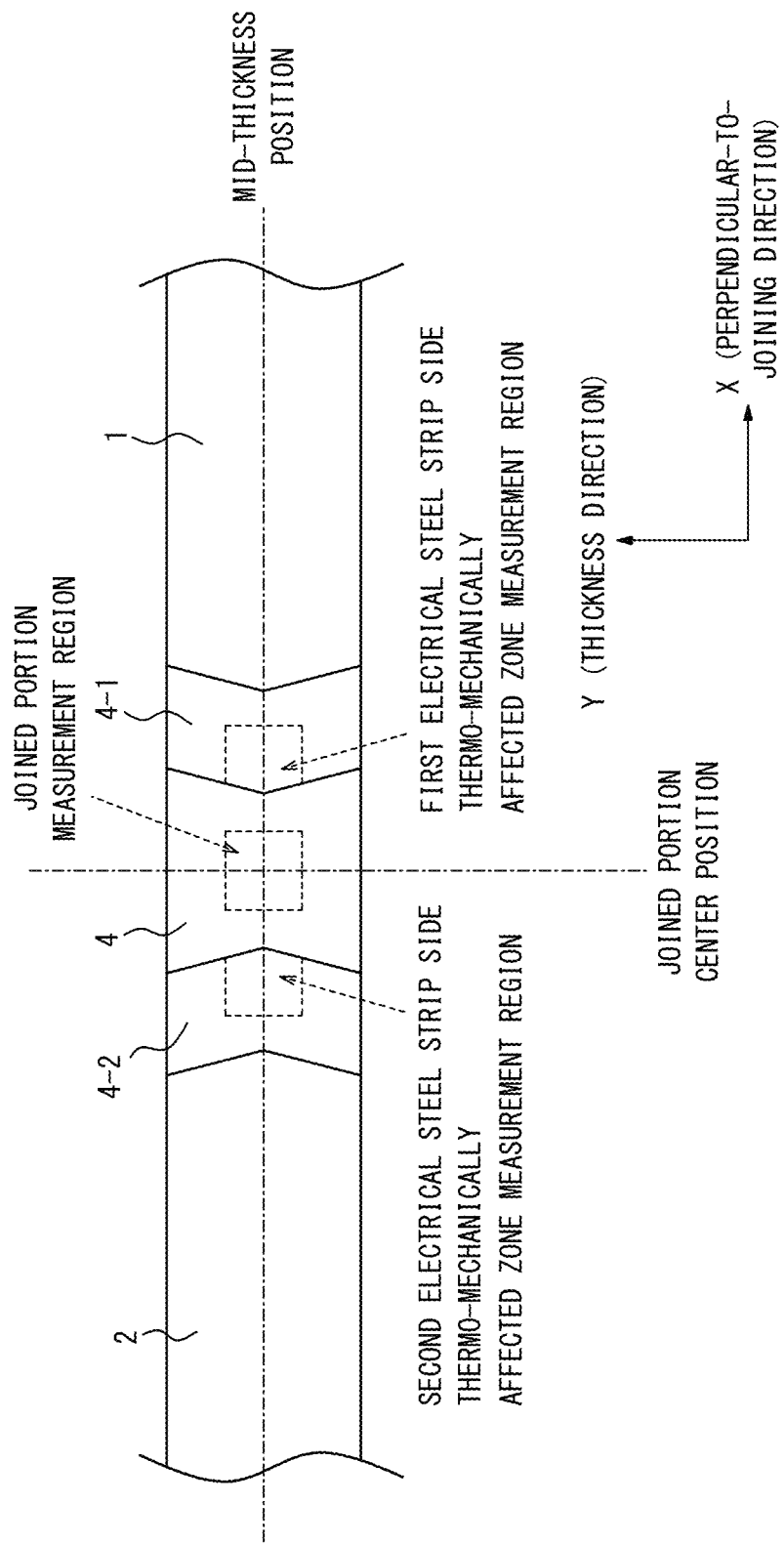
FIG. 17 is a schematic diagram of an electrical steel strip welded joint obtained by the electrical steel strip friction stir welding method according to an embodiment of the present disclosure.

The following is a description of an electrical steel strip welded joint, with reference to FIG. 17. In the drawing, reference sign 1 indicates the first electrical steel strip (material to be joined), 2 indicates the second electrical steel strip (material to be joined), 4 indicates the joined portion, 4-1 indicates the thermo-mechanically affected zone (first electrical steel strip side), and 4-2 indicates the thermo-mechanically affected zone (second electrical steel strip side). FIG. 17 illustrates a thickness direction cross section view of the electrical steel strip welded joint. In the drawing, the vertical direction is the thickness direction. The horizontal direction is the perpendicular-to-joining direction. The direction perpendicular to the plane of the paper towards the reader is the joining direction. That is, the plane illustrated in FIG. 17 (the thickness direction cross section) includes the perpendicular-to-joining direction and the thickness direction.

The above-mentioned electrical steel strip welded joint is:
an electrical steel strip welded joint, joining the first electrical steel strip and the second electrical steel strip,
the electrical steel strip welded joint including a joined portion and a thermo-mechanically affected zone adjacent to the joined portion, where
the steel microstructures of the joined portion and the thermo-mechanically affected zone are mainly ferrite phase, respectively, and
the following Expressions (1) to (4) are satisfied.

$$Dsz \leq 200 \ \mu m \quad (1)$$

$$Dhaz1 \leq Dbm1 \quad (2)$$

$$Dhaz2 \leq Dbm2 \quad (3)$$

$$0.9 \times (Hbm1 + Hbm2)/2 \leq Hsz \leq 1.2 \times (Hbm1 + Hbm2)/2 \quad (4)$$

Here,
Dsz is the average value (μm) of ferrite grain size of the joined portion,
Dhaz1 is the average value (μm) of ferrite grain size of the thermo-mechanically affected zone on the first electrical steel strip side,
Dhaz2 is the average value (μm) of ferrite grain size of the thermo-mechanically affected zone on the second electrical steel strip side,
Dbm1 is the average value (μm) of ferrite grain size of the base metal portion of the first electrical steel strip,
Dbm2 is the average value (μm) of ferrite grain size of the base metal portion of the second electrical steel strip,
Hsz is the average value of hardness of the joined portion,
Hbm1 is the average value of hardness of the base metal portion of the first electrical steel strip, and
Hbm2 is the average value of hardness of the base metal portion of the second electrical steel strip.

Further, the electrical steel strip welded joint may be obtained (produced), for example, by the electrical steel strip friction stir welding method according to an embodiment of the present disclosure, described above.

[Material to be Joined (First Electrical Steel Strip and Second Electrical Steel Strip)]

The first electrical steel strip and the second electrical steel strip are electrical steel strips that are the material to be joined. The chemical compositions of the first electrical steel strip and the second electrical steel strip are not particularly limited as long as the chemical compositions are typical of electrical steel strips (electrical steel sheets) at a cold rolling stage.

As a chemical composition of such an electrical steel strip, an example is a chemical composition containing Si in a range of 2.0 mass % to 5.0 mass %. Further, the following chemical composition is an example: C: 0.005 mass % or less, Si: 2.0 mass % to 5.0 mass %, Al: 3.0 mass % or less, Mn: 2.00 mass % or less, P: 0.2 mass % or less, S: 0.01 mass % or less, and N: 0.01 mass % or less, with the balance being Fe and inevitable impurity. The above chemical composition may contain at least one selected from the group consisting of, in mass %: Sn: 0.2% or less, Sb: 0.2% or less, Ca: 0.01% or less, REM: 0.05% or less, and Mg: 0.01% or less. Further, the above chemical compositions may contain at least one element selected from the group consisting of, in mass %: Cr: 1% or less, Ni: 1% or less, and Cu: 1% or less. Elements other than Si and Fe may each be 0%.

Further, the chemical compositions of the first electrical steel strip and the second electrical steel strip may be the same or different.

The thickness t1 of the first electrical steel strip and the thickness t2 of the second electrical steel strip are not particularly limited. t1 and t2 are respectively preferably 1.2 mm to 3.2 mm. t1 and t2 may be the same or different.

Further, in the material to be joined, that is, the first electrical steel strip and the second electrical steel strip, a region not affected by hot working due to frictional heat and plastic flow is called the base metal portion.

Further, the base metal portion, as well as the joined portion and the thermo-mechanically affected zone described below, are defined as follows.

The electrical steel strip welded joint is cut in the thickness (vertical) direction so that the plane illustrated in FIG. 17 (that is, the plane including the perpendicular-to-joining direction and the thickness direction) is the cross section. The cross section is then polished and etched with a saturated picric acid solution, nital (a solution of nitrate and ethanol) or aqua regia (a solution of concentrated hydrochloric acid and concentrated nitrate mixed in a 3:1 volume ratio). The cross section is then observed under an optical microscope to determine the degree of etching and the like, and to delineate the base metal portion, the joined portion, and the thermo-mechanically affected zone.

[Joined Portion]

The joined portion is the region that undergoes hot working due to frictional heat and plastic flow between the rotating tool and the material to be joined, resulting in a recrystallized microstructure.

The joined portion is composed of a mainly ferrite phase steel microstructure, specifically, with ferrite phase having an area ratio of 95% or more. The area ratio of the ferrite phase may be 100%. The area ratio of the residual microstructure other than the ferrite phase is 5% or less. As the residual microstructure other than the ferrite phase, examples include secondary phases such as martensite, sulfides, nitrides, carbides, and the like. The area ratio of the residual microstructure may be 0%.

The area ratio of the ferrite phase is measured as follows.

A test piece is cut from the electrical steel strip welded joint so that a joined portion measurement region, described below, is included in an observation plane. The observation plane is the plane illustrated in FIG. 17 (that is, the plane that includes the perpendicular-to-joining direction and the thickness direction). The observation plane of the test piece is then polished and etched with 3 vol % nital, saturated picric acid solution or aqua regia to reveal the microstructure. Then, in the joined portion measurement region, described below, a total of ten fields of view are captured with an optical microscope at a magnification of 500×. From the obtained microstructure images, the area of ferrite phase is calculated for the ten fields of view using Adobe Photoshop, sold by Adobe Systems Inc. The area of ferrite phase calculated for each field of view is then divided by the area of the field of view and multiplied by 100. The arithmetic mean of those values is then used as the area ratio of the ferrite phase.

Further, refinement of the steel microstructure of the joined portion is important. Specifically, reducing grain size of ferrite crystal grains of the steel microstructure of the joined portion (hereinafter also referred to as ferrite grain size) to satisfy the relationship of the following Expression (1) is important. As a result, even when electrical steel strips are used as the material to be joined, mechanical properties of the coil joint are improved without causing deterioration of the shape of the coil joint, and the occurrence of coil joint fractures in a production line is effectively inhibited.

$$Dsz \leq 200 \ \mu m \tag{1}$$

Here,

Dsz is the average value (μm) of ferrite grain size of the joined portion.

Here, Dsz is measured in accordance with Japanese Industrial Standard JIS G 0551. Specifically, measurement is made as follows.

The electrical steel strip welded joint is cut in the thickness (vertical) direction so that the plane illustrated in FIG. 17 (that is, the plane including the perpendicular-to-joining direction and the thickness direction) is the cross section. In the cross section, the X axis is the perpendicular-to-joining direction and the Y axis is the thickness direction. The origin of the X axis and the Y axis is the center position of the joined portion in the perpendicular-to-joining direction and the mid-thickness position of the material to be joined in the thickness (vertical) direction. The center position of the joined portion in the perpendicular-to-joining direction is, for example, the center position of the butt gap in the case of a butt joint or the center position of the overlapped portion in the case of a lap joint. The mid-thickness position of the material to be joined in the thickness (vertical) direction is, for example, the mid-thickness position of the smaller of the first electrical steel strip and the second electrical steel strip in the case of a butt joint, or the mid-thickness position of the overlapped portion in the case of a lap joint. A region defined as X=−0.2×t to +0.2×t and Y=−0.2×t to +0.2×t is the measurement region. Here, t is an average value (mm) of thickness of the first electrical steel strip and thickness of the second electrical steel strip. However, when the measurement region includes a region that is not the joined portion, such as the thermo-mechanically affected zone or the base metal portion, such a region is excluded from the measurement region. For the X axis and the Y axis, + and − may be set arbitrarily.

Then, at any position in the measurement region, ferrite grain size of the joined portion is measured a total of five times by the cutting method (evaluated by the number of crystal grains captured per 1 mm of a test line or the number P of intersections) in accordance with JIS G 0551 "Steels-Micrographic determination of the apparent grain size", and the average value of these measurements is Dsz. The measurement region of ferrite grain size of the joined portion is hereinafter also referred to simply as the joined portion measurement region.

Further, reducing a hardness difference between the joined portion and the base metal portion, specifically to satisfy the relationship of the following Expression (4), is important. As a result, even when electrical steel strips are used as the material to be joined, mechanical properties of the coil joint are improved without causing deterioration of the shape of the coil joint, and the occurrence of coil joint fractures in a production line is effectively inhibited.

$$0.9 \times (Hbm1 + Hbm2)/2 \leq Hsz \leq 1.2 \times (Hbm1 + Hbm2)/2 \tag{4}$$

Here,

Hsz is the average value of hardness of the joined portion,

Hbm1 is the average value of hardness of the base metal portion of the first electrical steel strip, and Hbm2 is the average value of hardness of the base metal portion of the second electrical steel strip.

Here, Hsz, Hbm1, and Hbm2 are measured in accordance with JIS Z 2244. Specifically, each is measured as follows.

Vickers hardness (HV) is measured at any five locations in the joined portion measurement region on the cross section under a condition of test force: 4.9 N. The average of these values is then taken as Hsz.

Further, on the cross section, Vickers hardness (HV) is measured at any five locations in a region ±0.2×t1 (level in the thickness (vertical) direction) from the mid-thickness position of the base metal portion of the first electrical steel strip and any five locations in a region ±0.2×t2 (level in the thickness (vertical) direction) from the mid-thickness position of the base metal portion of the second electrical steel strip, under the test force: 4.9 N. The position along the perpendicular-to-joining (horizontal) direction may be selected arbitrarily, as long as the position is in the base metal portion. The average values of Vickers hardness (HV) measured on the base metal portion of the first electrical steel strip and the base metal portion of the second electrical steel strip are Hbm1 and Hbm2, respectively. Here, t1 and t2 are the thicknesses of the first electrical steel strip and the second electrical steel strip, respectively.

Further, the thickness of the joined portion is not particularly limited. Appropriate control of the relationship between the thicknesses of the first electrical steel strip and the second electrical steel strip, specifically satisfying the relationships of the following Expressions (5) and (6), is preferred. As a result, even when electrical steel strips are used as the material to be joined, mechanical properties of the coil joint are further improved without causing deterioration of the shape of the coil joint, and the occurrence of coil joint fractures in a production line may be more effectively inhibited.

$$0.8 \times TbmL \leq TszL \quad (5)$$

$$TszH \leq 1.3 \times TbmH \quad (6)$$

Here,
TszL is the minimum value (mm) of the thickness of the joined portion,
TszH is the maximum value (mm) of the thickness of the joined portion,
TbmL is the thickness (mm) of the thinner of the first electrical steel strip and the second electrical steel strip, and
TbmH is the thickness (mm) of the thicker of the first electrical steel strip and the second electrical steel strip.

When the thicknesses of the first electrical steel strip and the second electrical steel strip are the same, TbmL=TbmH.

TszL and TszH may be measured as follows, for example. The electrical steel strip welded joint is cut in the thickness (vertical) direction so that the plane illustrated in FIG. 17 (that is, the plane including the perpendicular-to-joining direction and the thickness direction) is the cross section. Then, TszL and TszH are measured at the cross section using a caliper or the like.

[Thermo-Mechanically Affected Zone]

The thermo-mechanically affected zone is adjacent to the joined portion and is a region affected by hot working due to frictional heat and plastic flow, but the temperature and working are insufficient to reach a recrystallized microstructure. Further, the thermo-mechanically affected zone is formed on both sides of the first electrical steel strip and the second electrical steel strip adjacent to the joined portion.

The thermo-mechanically affected zone, like the joined portion, is composed of a mainly ferrite phase steel microstructure, specifically, a ferrite phase having an area ratio of 95% or more. The area ratio of the ferrite phase may be 100%. The area ratio of the residual microstructure other than the ferrite phase is 5% or less. As the residual microstructure other than the ferrite phase, examples include secondary phases such as martensite, sulfides, nitrides, carbides, and the like. The area ratio of the residual microstructure may be 0%. The area ratio of the ferrite phase may be measured by the same method as described above.

Further, refinement of the steel microstructure of the thermo-mechanically affected zone is important. Specifically, making the ferrite grain size in the thermo-mechanically affected zone equal to or less than the ferrite grain size in the base metal portion, that is, satisfying the relationships of the following Expressions (2) and (3), is important.

$$Dhaz1 \leq Dbm1 \quad (2)$$

$$Dhaz2 \leq Dbm2 \quad (3)$$

Here,
Dhaz1 is the average value (µm) of ferrite grain size of the thermo-mechanically affected zone on the first electrical steel strip side,
Dhaz2 is the average value (µm) of ferrite grain size of the thermo-mechanically affected zone on the second electrical steel strip side,
Dbm1 is the average value (µm) of ferrite grain size of the base metal portion of the first electrical steel strip, and
Dbm2 is the average value (µm) of ferrite grain size of the base metal portion of the second electrical steel strip.

Here, Dhaz1, Dhaz2, Dbm1, and Dbm2 are measured in the same manner as Dsz, the average value of ferrite grain size of the joined portion, according to JIS G 0551.

Further, the measurement region of the ferrite grain size of the thermo-mechanically affected zone on the first electrical steel strip side (hereinafter also referred to as the first electrical steel strip side thermo-mechanically affected zone measurement region) is set as follows. The electrical steel strip welded joint is cut in the thickness (vertical) direction so that the plane illustrated in FIG. 17 (that is, the plane including the perpendicular-to-joining direction and the thickness direction) is the cross section. In the cross section, the X axis is the perpendicular-to-joining direction and the Y axis is the thickness direction. A boundary position between the joined portion and the thermo-mechanically affected zone on the first electrical steel strip side at the mid-thickness position (level) of the first electrical steel strip is the origin of the X axis and the Y axis. For the X axis, the first electrical steel strip side is + and the joined portion side is −, and the measurement region is a region defined as X=0 to +0.4×t1 and Y=−0.2×t1 to +0.2×t1. Here, t1 is the thickness of the first electrical steel strip. For the Y axis, + and − may be set arbitrarily. However, when the measurement region includes a region that is not the thermo-mechanically affected zone on the first electrical steel strip side, such as the joined portion or the base metal portion, such a region is excluded from the measurement region.

As mentioned above, the joined portion is the region that undergoes hot working due to frictional heat and plastic flow between the rotating tool and the material to be joined, resulting in a recrystallized microstructure. The thermo-mechanically affected zone is a region adjacent to the joined portion and is affected by hot working due to frictional heat and plastic flow, but the temperature and working are insufficient to reach a recrystallized microstructure. The base metal is the region unaffected by hot working due to frictional heat and plastic flow.

Similarly, the measurement region of the ferrite grain size of the thermo-mechanically affected zone on the second electrical steel strip side (hereinafter also referred to as the second electrical steel strip side thermo-mechanically affected zone measurement region) is set as follows. The electrical steel strip welded joint is cut in the thickness (vertical) direction so that the plane illustrated in FIG. 17 (that is, the plane including the perpendicular-to-joining direction and the thickness direction) is the cross section. In the cross section, the X axis is the perpendicular-to-joining direction and the Y axis is the thickness direction. A boundary position between the joined portion and the thermo-mechanically affected zone on the second electrical steel strip side at the mid-thickness position (level) of the second electrical steel strip is the origin of the X axis and the Y axis. For the X axis, the second electrical steel strip side is + and the joined portion side is −, and the measurement region is a region defined as X=0 to +0.4×t2 and Y=−0.2×t2 to +0.2×t2. Here, t2 is the thickness of the second electrical steel strip. For the Y axis, + and − may be set arbitrarily. However, when the measurement region includes a region that is not the thermo-mechanically affected zone on the second electrical steel strip side, such as the joined portion or the base metal portion, such a region is excluded from the measurement region.

Further, the measurement regions of ferrite grain size of the base metal portions of the first electrical steel strip and the second electrical steel strip (hereinafter also referred to as the first electrical steel strip and second electrical steel strip base metal portion measurement regions) may be, on the cross section, a region of ±0.2×t1 from the mid-thickness position of the base metal portion of the first electrical steel strip (level in the thickness (vertical) direction) and a region of ±0.2×t2 from the mid-thickness position of the base metal portion of the second electrical steel strip (level in the thickness (vertical) direction), respectively. The position along the perpendicular-to-joining (horizontal) direction may be selected arbitrarily, as long as the position is in the base metal portion. Here, t1 and t2 are the thicknesses of the first electrical steel strip and the second electrical steel strip, respectively.

Examples of joint types include butt joints and lap joints.

[3] Method of Producing Electrical Steel Strip

The following describes a method of producing an electrical steel strip according to an embodiment of the present disclosure.

The method of producing an electrical steel strip according to an embodiment of the present disclosure includes:
joining a first electrical steel strip and a second electrical steel strip by the electrical steel strip friction stir welding method according to an embodiment of the present disclosure to obtain a joined steel strip; and
cold rolling the joined steel strip to obtain a cold-rolled steel strip.

Here, the joined steel strip preferably includes the first electrical steel strip, the second electrical steel strip, and the electrical steel strip welded joint of [2] above, where the first electrical steel strip and the second electrical steel strip are joined via the electrical steel strip welded joint.

Further, cold rolling conditions are not particularly limited, and may be in accordance with a conventional method. Further, pickling may optionally be performed after joining the first electrical steel strip and the second electrical steel strip and prior to cold rolling.

EXAMPLES

Functions and effects of the present disclosure are described below with reference to Examples. However, the present disclosure is not limited to the following Examples.

Electrical steel strips having the chemical compositions listed in Table 1 (the balance being Fe and inevitable impurity) were used as the material to be joined (the first electrical steel strip and the second electrical steel strip). The first electrical steel strip (preceding steel strip) and the second electrical steel strip (trailing steel strip) were preheated and then joined by preheated friction stir welding under the preheating conditions listed in Table 2 and the joining conditions listed in Tables 3 and 4, simulating being on a continuous cold rolling line, to produce the electrical steel strip welded joint. In the case of butt joining, the groove was a so-called I-type groove with no groove angle to the ends of the two electrical steel strips to be joined, and the two electrical steel strips were butted and joined with a surface state equivalent to that of milling. The same was true for Tables 3 and 4 below. Average values of ferrite grain size, average values of hardness, and Erichsen values of the base metal portion of the electrical steel strips are also listed in Table 1. Here, the average values of ferrite grain size and the average values of hardness of the base metal portion of the electrical steel strips were obtained by the methods described above. Further, the Erichsen values were measured in accordance with the Erichsen test method specified in JIS Z 2247. Conditions not specified were set in accordance with conventional methods.

In the preheating process, the heating device was moved in the joining direction in conjunction with the rotating tools (at the same speed as the joining speed). A high-frequency induction heating device was used as the heating device. More specifically, a high-frequency power supply with a maximum output of 100 KW and a frequency band of 70 kHz to 90 kHz was connected to a rectangular induction heating coil of 100 mm long and 30 mm wide. The induction heating coil was installed so that its 100-mm-long sides were parallel to the joining travelling direction and 10 mm away from the surface in the thickness direction on one side or both sides of the material to be joined. Regarding the arrangement of heating device in Table 2, "single-sided" meant that the heating device was arranged on only one side (front side) of the material to be joined, and "double-sided" meant that the heating device was arranged on both sides (both front side and back side) of the material to be joined. Preheating temperature was measured on both sides of the material to be joined by thermography provided in the friction stir welding device. The measured preheating temperatures of the material to be joined are also listed in Table 2. $TP_{W=0.2D}$ and $TP_{W=0.5D}$ were measured both on the advancing side (first electrical steel strip side) and the retreating side (second electrical steel strip side) across the joining center line, and the temperatures were almost the Therefore, only the temperatures measured on the advancing side are same listed here as representative. For comparison, preheating was not performed in some sets of conditions.

In the joining process, the front side rotating tool disposed on the vertically upper side was rotated clockwise when viewed from the vertically upper side, and the back side rotating tool disposed on the vertically lower side was rotated counterclockwise when viewed from the vertically upper side. That is, both were rotated counterclockwise when viewed from in front of the lead end of the rotating tool. Further, in each case, one of the rotating tools illustrated in FIG. 2A to FIG. 8 was used. Further, the front side rotating tool and the back side rotating tool had the same cross section dimensions and shape as each other. Each of the rotating tools was made of tungsten carbide (WC) with a Vickers hardness of HV 1090, which was harder than the material to be joined. Further, when the thicknesses of the first electrical steel strip and the second electrical steel strip were different, the butted portion of the first electrical steel strip and the second electrical steel strip was made with the back side (the side where the back side rotating tool was disposed) having no step and the front side (the side where the front side rotating tool was disposed) having a step. The joining was performed with the first electrical steel strip (preceding steel strip) as advancing side and the second electrical steel strip (trailing steel strip) as retreating side.

In the case of lap joining, the joining was performed so that the first electrical steel strip (preceding steel strip) was the upper side of the overlap and the second electrical steel strip (trailing steel strip) was the lower side of the overlap. The direction of rotation of the rotating tool, the shape of the rotating tool, and the like were the same as in the case of butt joining.

For the electrical steel strip welded joints thus obtained, the joined portion, the thermo-mechanically affected zone, and the base metal portion were defined as described above.

Further, the following were measured as described above:
Dsz: average value (µm) of ferrite grain size of the joined portion,
Dhaz1: average value (µm) of ferrite grain size of the thermo-mechanically affected zone on the first electrical steel strip side, Dhaz2: average value (μm) of ferrite grain size of the thermo-mechanically affected zone on the second electrical steel strip side, Dbm1: average value (μm) of ferrite grain size of the base metal portion of the first electrical steel strip, Dbm2: average value (μm) of ferrite grain size of the base metal portion of the second electrical steel strip, Hsz: average value of hardness of the joined portion, Hbm1: average value of hardness of the base metal portion of the first electrical steel strip, and Hbm2: average value of hardness of the base metal portion of the second electrical steel strip.

Further, in a cross section in the vertical direction of each electrical steel strip welded joint (the plane illustrated in FIG. 17 (that is, the plane including the perpendicular-to-joining direction and the thickness direction)), TszL: minimum value (mm) of joined portion thickness and TszH: maximum value (mm) of joined portion thickness were measured.

The results are listed in Table 5. The above measurements were omitted when defects were identified in the checking of surface defects and internal defects described below. Further, when surface defects were identified, checking of internal defects was also omitted.

The electrical steel strip welded joints were checked for (I) presence of surface defects and (II) presence of internal defects according to the following procedures. Results are listed in Table 6.

(I) Presence of Surface Defects

The front side and back side of the joined portion and the thermo-mechanically affected zone (in the case of laser welding, the welded portion and the heat-affected zone) of the electrical steel strip welded joints were visually checked for the presence of an unjoined state and cracking. The presence or absence of surface defects was then judged according to the following criteria.

Surface defect: no meant that an unjoined state and cracking were not identified.

Surface defect: yes meant that at least one of an unjoined state or cracking was identified.

(II) Presence of Internal Defects

The electrical steel strip welded joints were cut in the thickness (vertical) direction so that the plane illustrated in FIG. 17 (that is, the plane including the perpendicular-to-joining direction and the thickness direction) became the observation plane, and test pieces were collected. The cutting positions along the joining direction were 20 mm from an end of the material to be joined on a side where joining (welding) started, 20 mm from an end of the material to be joined on a side where joining (welding) ended, and in the middle of both ends of the material to be joined. For each electrical steel strip welded joint, a total of three test pieces were collected such that the cross sections at the cutting positions became observation planes. The observation plane of each obtained test piece was then observed under an optical microscope (magnification: 10×). The presence or absence of internal defects was then judged according to the following criteria.

Internal defect: no meant that an unjoined state and cracking were not identified in the joined portion of all three test pieces.

Internal defect: yes meant that at least one of an unjoined state or cracking was identified in the joined portion in at least one of the test pieces.

The electrical steel strip welded joints were evaluated for effectiveness in inhibiting the occurrence of coil joint fractures in a production line (hereinafter also referred to as fracture inhibition effect) in the following way.

Test pieces were collected from each of the electrical steel strip welded joints so that the joined portion, the thermo-mechanically affected zone and base metal on the first electrical steel strip side, and the thermo-mechanically affected zone and base metal on the second electrical steel strip side were included. Then, using the collected test pieces, the Erichsen values of the welded joints were measured in accordance with the Erichsen test method specified in JIS Z 2247. The ratio of the Erichsen value of the welded joint to the Erichsen value of the base metal portion (hereinafter also referred to as the Erichsen value ratio) was used to evaluate the fracture inhibition effect based on the following criteria. Results are listed in Table 6.

[Erichsen value ratio (%)] = [Erichsen value of welded joint]/

[Erichsen value of base metal portion] × 100

○ (Pass): Erichsen value ratio of 80% or more

× (Fail): Erichsen value ratio of less than 80%.

When the Erichsen value of the base metal portion of the first electrical steel strip and the Erichsen value of the base metal portion of the second electrical steel strip were different, the Erichsen value of the base metal portion was considered to be the smaller of the Erichsen value of the base metal portion of the first electrical steel strip and the Erichsen value of the base metal portion of the second electrical steel strip.

Further, durability of the rotating tools was evaluated according to the following procedure.

When the rotating tools are damaged or worn, joining failures due to internal defects occur at a high rate. Therefore, joining was repeated with a joint length of 0.5 m under the same conditions as above, and the resulting welded joints were judged for the presence or absence of internal defects by the judgment method described under "(II) Presence of internal defects" above.

The durability of the rotating tools was evaluated based on the maximum number of joints at which 90% or more of the total number of joints were judged to be free of internal defects (hereinafter also referred to as 90% maintained maximum joint number). The 90% maintained maximum joint numbers are also listed in Table 6. When the 90% maintained maximum joint number was 35 or more, the durability (life span) of the rotating tool was judged to be particularly excellent (⊚). When the 90% maintained maximum joint number was less than 35 and 25 or more, the durability (life span) of the rotating tool was judged to be excellent (○). When the 90% maintained maximum joint number was less than 25, the durability (life span) of the rotating tool was judged to be insufficient (×).

Here, when checking for presence of internal defects in the welded joints in the order of joining, and N is the number of the welded joints checked for presence of internal defects, the 90% maintained maximum joint number is the maximum value of N that satisfies the following Expression (a).

[number of welded joints judged to be free of internal (a)

defects among welded joints checked for internal defects] ÷

[number of welded joints checked for internal defects] × 100 ≥ 90

For example, when the welded joints obtained from the 1st to 4th joins are judged to have no internal defects, but the welded joint obtained from the 5th join is judged to have an internal defect:

when N=4,

[number of welded joints judged to be free of internal defects among welded joints checked for internal defects] ÷

[number of welded joints checked for internal defects $N$] × 100 =

$$4 \div 4 \times 100 = 100 \geq 90$$

and when N=5,

[number of welded joints judged to be free of internal defects among welded joints checked for internal defects] ÷

[number of welded joints checked for internal defects $N$] × 100 =

$$4 \div 5 \times 100 = 80 < 90$$

In other words, in this case, Expression (a) is satisfied up to N=4, and Expression (a) is not satisfied from N=5, so the 90% maintained maximum joint number is 4.

Further, when the welded joints obtained from the 1st to 10th and 12th to 19th joins are judged to have no internal defects, but the welded joints obtained from the 11th, 20th, and 21st joins are judged to have an internal defect:

when N=11,

[number of welded joints judged to be free of internal defects among welded joints checked for internal defects] ÷

[number of welded joints checked for internal defects $N$] × 100 =

$$10 \div 11 \times 100 \approx 90.9 \geq 90$$

when N=20,

[number of welded joints judged to be free of internal defects among welded joints checked for internal defects] ÷

[number of welded joints checked for internal defects $N$] × 100 =

$$18 \div 20 \times 100 = 90 \geq 90$$

when N=21,

[number of welded joints judged to be free of internal defects among welded joints checked for internal defects] ÷

[number of welded joints checked for internal defects $N$] × 100 =

$$18 \div 21 \times 100 = 85.7 < 90$$

In other words, in this case, Expression (a) is satisfied up to N=20, and Expression (a) is not satisfied from N=21, so the 90% maintained maximum joint number is 20.

The 90% maintained maximum joint number was 0 for welded joints judged to have defects in (I) Presence of surface defects or (II) Presence of internal defects as described above.

TABLE 1

| Steel sample ID | Thickness (mm) | Chemical composition (mass %) | | | | | Average ferrite grain size in base metal portion (μm) | Average hardness of base metal portion (HV) | Erichsen value of base metal portion (mm) |
|---|---|---|---|---|---|---|---|---|---|
| | | C | Si | Mn | P | S | | | |
| B1-1 | 2.0 | 0.02 | 2.5 | 0.01 | 0.015 | 0.006 | 280 | 219 | 12.4 |
| B1-2 | 2.6 | 0.02 | 2.5 | 0.01 | 0.015 | 0.006 | 280 | 219 | 13.5 |
| B2-1 | 2.0 | 0.01 | 3.5 | 0.02 | 0.012 | 0.006 | 310 | 242 | 3.5 |
| B2-2 | 2.6 | 0.01 | 3.5 | 0.02 | 0.012 | 0.006 | 310 | 242 | 3.8 |

TABLE 2

| Preheating conditions | Joint type | Material to be joined | | | | | | Preheating conditions | | | | |
|---|---|---|---|---|---|---|---|---|---|---|---|---|
| | | First electrical steel strip | | Second electrical steel strip | | | | | Front side | | Back side | |
| | | Steel sample ID | Thickness t1 (mm) | Steel sample ID | Thickness t2 (mm) | t (mm) | TJ (mm) | Arrangement of heating device | Moving speed (mm/min) | Frequency (kHz) | Output (kW) | Frequency (kHz) | Output (kW) |
| 1 | Butt | B2-1 | 2.0 | B1-1 | 2.0 | 2.0 | 2.0 | Single-sided | 3500 | 104 | 12 | — | — |
| 2 | Butt | B1-1 | 2.0 | B1-1 | 2.0 | 2.0 | 2.0 | Double-sided | 6000 | 104 | 12 | 104 | 12 |
| 3 | Butt | B1-1 | 2.0 | B1-1 | 2.0 | 2.0 | 2.0 | Single-sided | 5000 | 98 | 22 | — | — |
| 4 | Butt | B2-1 | 2.0 | B2-1 | 2.0 | 2.0 | 2.0 | Double-sided | 6000 | 98 | 22 | 98 | 22 |
| 5 | Butt | B2-1 | 2.0 | B2-1 | 2.0 | 2.0 | 2.0 | Single-sided | 4000 | 83 | 46 | — | — |
| 6 | Butt | B1-2 | 2.6 | B1-2 | 2.6 | 2.6 | 2.6 | Double-sided | 5000 | 83 | 46 | 83 | 46 |

TABLE 2-continued

| | | | | | | | | | | | | |
|---|---|---|---|---|---|---|---|---|---|---|---|---|
| 7 | Butt | B1-2 | 2.6 | B1-2 | 2.6 | 2.6 | 2.6 | Single-sided | 5000 | 83 | 46 | — | — |
| 8 | Butt | B2-2 | 2.6 | B2-2 | 2.6 | 2.6 | 2.6 | Double-sided | 6000 | 83 | 46 | 83 | 46 |
| 9 | Butt | B2-2 | 2.6 | B2-2 | 2.6 | 2.6 | 2.6 | Single-sided | 6000 | 53 | 97 | — | — |
| 10 | Butt | B2-2 | 2.6 | B2-2 | 2.6 | 2.6 | 2.6 | Double-sided | 6000 | 53 | 97 | 53 | 97 |
| 11 | Lap | B1-1 | 2.0 | B1-1 | 2.0 | 2.0 | 4.0 | Double-sided | 3500 | 98 | 22 | 98 | 22 |

| | | Preheating temperature (° C.) | | | | | |
|---|---|---|---|---|---|---|---|
| | | Front side | | | | | Back side |
| Preheating conditions | Joint type | $TP_{w=0}$ | $TP_{w=0.2D}$ | $TP_{w=0.5D}$ | $TP_{w=0.2D}/TP_{w=0}$ | $TP_{w=0.5D}/TP_{w=0}$ | $TP_{w=0}$ | $TP_{w=0.2D}$ |
| 1 | Butt | 80 | 60 | 30 | 0.75 | 0.38 | 60 | 40 |
| 2 | Butt | 140 | 110 | 60 | 0.79 | 0.43 | 140 | 110 |
| 3 | Butt | 170 | 120 | 60 | 0.71 | 0.35 | 130 | 100 |
| 4 | Butt | 300 | 220 | 100 | 0.73 | 0.33 | 300 | 220 |
| 5 | Butt | 500 | 400 | 210 | 0.80 | 0.42 | 420 | 320 |
| 6 | Butt | 590 | 470 | 250 | 0.80 | 0.42 | 590 | 470 |
| 7 | Butt | 440 | 350 | 170 | 0.80 | 0.39 | 350 | 280 |
| 8 | Butt | 500 | 400 | 210 | 0.80 | 0.42 | 500 | 400 |
| 9 | Butt | 990 | 910 | 400 | 0.92 | 0.40 | 910 | 820 |
| 10 | Butt | 1180 | 800 | 550 | 0.68 | 0.47 | 1180 | 800 |
| 11 | Lap | 450 | 352 | 170 | 0.78 | 0.38 | 450 | 352 |

| Preheating conditions | Preheating temperature (° C.) Back side | | | Expression (11) | Expression (12) | Expression (13) | Expression (14) | Expression (15) |
|---|---|---|---|---|---|---|---|---|
| | $TP_{w=0.5D}$ | $TP_{w=0.2D}/TP_{w=0}$ | $TP_{w=0.5D}/TP_{w=0}$ | | | | | |
| 1 | 30 | 0.67 | 0.50 | X | X | X | X | X |
| 2 | 60 | 0.79 | 0.43 | ○ | ○ | ○ | ○ | ○ |
| 3 | 50 | 0.77 | 0.38 | ○ | ○ | ○ | ○ | ○ |
| 4 | 100 | 0.73 | 0.33 | ○ | ○ | ○ | ○ | ○ |
| 5 | 150 | 0.76 | 0.36 | ○ | ○ | ○ | ○ | ○ |
| 6 | 250 | 0.80 | 0.42 | ○ | ○ | ○ | ○ | ○ |
| 7 | 120 | 0.80 | 0.34 | ○ | ○ | ○ | ○ | ○ |
| 8 | 210 | 0.80 | 0.42 | ○ | ○ | ○ | ○ | ○ |
| 9 | 350 | 0.90 | 0.38 | ○ | ○ | ○ | ○ | ○ |
| 10 | 550 | 0.68 | 0.47 | X | ○ | ○ | X | X |
| 11 | 170 | 0.78 | 0.38 | ○ | ○ | ○ | ○ | ○ |

TABLE 3

| | | Material to be joined | | | | | | | Rotating tool | | |
|---|---|---|---|---|---|---|---|---|---|---|---|
| | | First electrical steel strip | | Second electrical steel strip | | | | | | Shoulder diameter D (mm) | Pin diameter (mm) |
| | Joint type | Steel sample ID | Thickness t1 (mm) | Steel sample ID | Thickness t2 (mm) | t (mm) | TJ (mm) | Preheating conditions | Shape | | |
| Example 1 | Butt | B1-1 | 2.0 | B1-1 | 2.0 | 2.0 | 2.0 | 2 | FIG. 2A | 13 | 4 |
| Example 2 | Butt | B1-1 | 2.0 | B1-1 | 2.0 | 2.0 | 2.0 | 3 | FIG. 2B | 20 | 6.7 |
| Example 3 | Butt | B2-1 | 2.0 | B2-1 | 2.0 | 2.0 | 2.0 | 4 | FIG. 2A | 13 | 4 |
| Example 4 | Butt | B2-1 | 2.0 | B2-1 | 2.0 | 2.0 | 2.0 | 5 | FIG. 2B | 20 | 6.7 |
| Example 5 | Butt | B1-2 | 2.6 | B1-2 | 2.6 | 2.6 | 2.6 | 6 | FIG. 2A | 13 | 4 |
| Example 6 | Butt | B1-2 | 2.6 | B1-2 | 2.6 | 2.6 | 2.6 | 7 | FIG. 2B | 20 | 6.7 |
| Example 7 | Butt | B2-2 | 2.6 | B2-2 | 2.6 | 2.6 | 2.6 | 8 | FIG. 2A | 13 | 4 |
| Example 8 | Butt | B2-2 | 2.6 | B2-2 | 2.6 | 2.6 | 2.6 | 9 | FIG. 2A | 13 | 4 |
| Example 9 | Butt | B2-1 | 2.0 | B1-1 | 2.0 | 2.0 | 2.0 | 1 | FIG. 2B | 20 | 6.7 |
| Example 10 | Butt | B2-2 | 2.6 | B2-2 | 2.6 | 2.6 | 2.6 | 10 | FIG. 2A | 13 | 4 |
| Example 11 | Lap | B1-1 | 2.0 | B1-1 | 2.0 | 2.0 | 4.0 | 11 | FIG. 2B | 20 | 6.7 |
| Comparative Example 1 | Butt | B2-1 | 2.0 | B2-1 | 2.0 | 2.0 | 2.0 | 4 | FIG. 2A | 13 | 4 |
| Comparative Example 2 | Butt | B2-1 | 2.0 | B2-1 | 2.0 | 2.0 | 2.0 | 5 | FIG. 2B | 20 | 6.7 |
| Comparative Example 3 | Butt | B1-1 | 2.0 | B2-1 | 2.0 | 2.0 | 2.0 | No preheating | FIG. 2A | 13 | 4 |

TABLE 3-continued

| | Joint type | Steel sample ID | Thickness t1 (mm) | Steel sample ID | Thickness t2 (mm) | t (mm) | TJ (mm) | Preheating conditions | Shape | Shoulder diameter D (mm) | RS × D³/JS ratio |
|---|---|---|---|---|---|---|---|---|---|---|---|
| Comparative Example 4 | Butt | B1-2 | 2.6 | B2-2 | 2.6 | 2.6 | 2.6 | No preheating | FIG. 2B | 20 | 6.7 |
| Comparative Example 5 | Lap | B1-1 | 2.0 | B1-1 | 2.0 | 2.0 | 4.0 | No preheating | FIG. 2B | 20 | 6.7 |

| | Joining conditions | | | | | | | | | |
|---|---|---|---|---|---|---|---|---|---|---|
| | Rotating tool Pin length (mm) | Tilt angle α (°) | Gap between shoulders G (mm) | Rotation speed RS (r/min) Front side | Back side | Joining speed JS (mm/min) | RS × D³/JS | Expression (7) | Expression (8) | Expression (9) | Expression (10) |
| Example 1 | 0.6 | 1.5 | 1.20 | 3000 | 3000 | 6000 | 1099 | ○ | ○ | ○ | ○ |
| Example 2 | 0.9 | 1 | 1.50 | 1700 | 1700 | 5000 | 2720 | ○ | ○ | ○ | ○ |
| Example 3 | 0.6 | 1.5 | 0.90 | 2500 | 2500 | 6000 | 915 | ○ | ○ | X | ○ |
| Example 4 | 0.9 | 1.5 | 1.90 | 1000 | 1000 | 4000 | 2000 | ○ | ○ | X | ○ |
| Example 5 | 0.6 | 2 | 1.80 | 1800 | 1800 | 5000 | 791 | ○ | ○ | ○ | ○ |
| Example 6 | 0.9 | 1.5 | 2.00 | 800 | 800 | 5000 | 1280 | ○ | ○ | ○ | ○ |
| Example 7 | 0.6 | 1.5 | 2.20 | 2200 | 2200 | 6000 | 806 | ○ | ○ | ○ | ○ |
| Example 8 | 0.6 | 1.5 | 2.40 | 2000 | 2000 | 6000 | 732 | ○ | ○ | X | ○ |
| Example 9 | 0.9 | 1.5 | 1.50 | 1300 | 1300 | 3500 | 2971 | ○ | ○ | ○ | ○ |
| Example 10 | 0.6 | 1.5 | 1.70 | 2200 | 2200 | 6000 | 806 | ○ | ○ | ○ | ○ |
| Example 11 | 0.9 | 1.5 | 3.00 | 2000 | 2000 | 3500 | 4571 | ○ | ○ | ○ | ○ |
| Comparative Example 1 | 0.6 | 1.5 | 0.90 | 800 | 800 | 6000 | 293 | ○ | X | ○ | ○ |
| Comparative Example 2 | 0.9 | 1.5 | 1.70 | 2000 | 2000 | 4000 | 4000 | ○ | X | ○ | ○ |
| Comparative Example 3 | 0.6 | 1.5 | 1.20 | 1500 | 1500 | 3000 | 1099 | ○ | ○ | ○ | ○ |
| Comparative Example 4 | 0.9 | 1.5 | 1.50 | 1200 | 1200 | 3000 | 3200 | ○ | ○ | ○ | ○ |
| Comparative Example 5 | 0.9 | 1.5 | 3.00 | 2000 | 2000 | 3500 | 4571 | ○ | ○ | ○ | ○ |

○ Satisfies the relationship in the Expression
x Does not satisfy the relationship in the Expression

TABLE 4

| | Material to be joined | | | | | | | Front side and back side rotating tools | | |
|---|---|---|---|---|---|---|---|---|---|---|
| | First electrical steel strip | | Second electrical steel strip | | | | | | | |
| | Joint type | Steel sample ID | Thickness t1 (mm) | Steel sample ID | Thickness t2 (mm) | t (mm) | TJ (mm) | Preheating conditions | Shape | Shoulder diameter D (mm) |
| Example 12 | Butt | B1-1 | 2.0 | B1-1 | 2.0 | 2.0 | 2.0 | 2 | FIG. 8 Concave-end | 9 |
| Example 13 | Butt | B1-1 | 2.0 | B1-1 | 2.0 | 2.0 | 2.0 | 3 | FIG. 7 Convex-end | 13 |
| Example 14 | Butt | B2-1 | 2.0 | B2-1 | 2.0 | 2.0 | 2.0 | 4 | FIG. 8 Concave-end | 13 |
| Example 15 | Butt | B2-1 | 2.0 | B2-1 | 2.0 | 2.0 | 2.0 | 5 | FIG. 6 Flat-end | 20 |
| Example 16 | Butt | B1-2 | 2.6 | B1-2 | 2.6 | 2.6 | 2.6 | 6 | FIG. 3 Flat-end | 13 |
| Example 17 | Butt | B1-2 | 2.6 | B1-2 | 2.6 | 2.6 | 2.6 | 7 | FIG. 7 Convex-end | 20 |
| Example 18 | Butt | B2-2 | 2.6 | B2-2 | 2.6 | 2.6 | 2.6 | 8 | FIG. 7 Convex-end | 20 |
| Example 19 | Butt | B2-2 | 2.6 | B2-2 | 2.6 | 2.6 | 2.6 | 9 | FIG. 4 Convex-end | 13 |
| Example 20 | Butt | B2-1 | 2.0 | B1-1 | 2.0 | 2.0 | 2.0 | 1 | FIG. 3 Flat-end | 20 |
| Example 21 | Butt | B2-2 | 2.6 | B2-2 | 2.6 | 2.6 | 2.6 | 10 | FIG. 7 Convex-end | 13 |
| Example 22 | Lap | B1-1 | 2.0 | B1-1 | 2.0 | 2.0 | 4.0 | 11 | FIG. 7 Convex-end | 20 |
| Comparative Example 6 | Butt | B2-1 | 2.0 | B2-1 | 2.0 | 2.0 | 2.0 | 4 | FIG. 8 Concave-end | 13 |
| Comparative Example 7 | Butt | B2-1 | 2.0 | B2-1 | 2.0 | 2.0 | 2.0 | 5 | FIG. 6 Flat-end | 24 |
| Comparative Example 8 | Butt | B1-1 | 2.0 | B2-1 | 2.0 | 2.0 | 2.0 | No preheating | FIG. 6 Flat-end | 9 |
| Comparative Example 9 | Butt | B1-2 | 2.6 | B2-2 | 2.6 | 2.6 | 2.6 | No preheating | FIG. 6 Flat-end | 20 |
| Comparative Example 10 | Lap | B1-1 | 2.0 | B1-1 | 2.0 | 2.0 | 4.0 | No preheating | FIG. 7 Convex-end | 20 |

TABLE 4-continued

| | Front side and back side rotating tools | | | Joining conditions | | | | | | | | |
|---|---|---|---|---|---|---|---|---|---|---|---|---|
| | | | | | Gap between shoulders G (mm) | Rotation speed RS (r/min) | | Joining speed JS (mm/min) | RS × D³/JS | Expression (7) | Expression (8) | Expression (9) | Expression (10) |
| | dv or dc (mm) | dv/D or dc/D | Stepped portion form | Tilt angle α (°) | | Front side | Back side | | | | | | |
| Example 12 | 0.2 | 0.022 | Step-like | 0 | 1.10 | 3000 | 3000 | 6000 | 365 | ○ | ○ | ○ | ○ |
| Example 13 | 0.5 | 0.038 | Step-like | 0 | 1.50 | 2000 | 2000 | 5000 | 879 | ○ | ○ | ○ | ○ |
| Example 14 | 0.3 | 0.023 | Grooved | 0 | 0.85 | 2500 | 2500 | 6000 | 915 | ○ | ○ | ○ | ○ |
| Example 15 | — | — | Grooved | 0 | 1.90 | 1000 | 1000 | 4000 | 2000 | ○ | ○ | X | ○ |
| Example 16 | — | — | — | 0 | 1.80 | 1800 | 1800 | 5000 | 791 | ○ | ○ | ○ | ○ |
| Example 17 | 0.5 | 0.025 | Step-like | 0 | 1.70 | 800 | 800 | 5000 | 1280 | ○ | ○ | ○ | ○ |
| Example 18 | 0.5 | 0.025 | Grooved | 0 | 1.90 | 2200 | 2200 | 6000 | 2933 | ○ | ○ | ○ | ○ |
| Example 19 | 0.5 | 0.038 | — | 0 | 2.10 | 2000 | 2000 | 6000 | 732 | ○ | ○ | ○ | ○ |
| Example 20 | — | — | — | 0 | 1.50 | 1300 | 1300 | 3500 | 2971 | ○ | ○ | ○ | ○ |
| Example 21 | 0.5 | 0.038 | Grooved | 0 | 1.70 | 2200 | 2200 | 6000 | 806 | ○ | ○ | ○ | ○ |
| Example 22 | 0.5 | 0.025 | Step-like | 0 | 3.00 | 2000 | 2000 | 3500 | 4571 | ○ | ○ | ○ | ○ |
| Comparative Example 6 | 0.3 | 0.023 | Grooved | 0 | 0.85 | 900 | 900 | 6000 | 330 | ○ | X | ○ | ○ |
| Comparative Example 7 | — | — | Grooved | 0 | 1.90 | 1500 | 1500 | 4000 | 5184 | X | X | X | ○ |
| Comparative Example 8 | — | — | Step-like | 0 | 1.20 | 3000 | 3000 | 3000 | 729 | ○ | ○ | ○ | ○ |
| Comparative Example 9 | — | — | Grooved | 0 | 1.80 | 1200 | 1200 | 3000 | 3200 | ○ | ○ | ○ | ○ |
| Comparative Example 10 | 0.5 | 0.025 | Step-like | 0 | 3.00 | 2000 | 2000 | 3500 | 4571 | ○ | ○ | ○ | ○ |

○ Satisfies the relationship in the Expression
x Does not satisfy the relationship in the Expression

TABLE 5

| | | Material to be joined | | | | | | | | | Joined portion | | |
|---|---|---|---|---|---|---|---|---|---|---|---|---|---|
| | | First electrical steel strip | | | | Second electrical steel strip | | | | | Ferrite phase | | |
| | Joint type | Steel sample ID | Dbm1 (μm) | Hbm1 | Thickness (mm) | Steel sample ID | Dbm2 (μm) | Hbm2 | Thickness (mm) | TbmL (mm) | TbmH (mm) | area ratio (%) | Dsz (μm) | Hsz |
| Example 1 | Butt | B1-1 | 280 | 219 | 2.0 | B1-1 | 280 | 219 | 2.0 | 2.0 | 2.0 | 99 | 75 | 237 |
| Example 2 | Butt | B1-1 | 280 | 219 | 2.0 | B1-1 | 280 | 219 | 2.0 | 2.0 | 2.0 | 99 | 95 | 240 |
| Example 3 | Butt | B2-1 | 310 | 242 | 2.0 | B2-1 | 310 | 242 | 2.0 | 2.0 | 2.0 | 99 | 83 | 246 |
| Example 4 | Butt | B2-1 | 310 | 242 | 2.0 | B2-1 | 310 | 242 | 2.0 | 2.0 | 2.0 | 99 | 165 | 238 |
| Example 5 | Butt | B1-2 | 280 | 219 | 2.6 | B1-2 | 280 | 219 | 2.6 | 2.6 | 2.6 | 99 | 91 | 235 |
| Example 6 | Butt | B1-2 | 280 | 219 | 2.6 | B1-2 | 280 | 219 | 2.6 | 2.6 | 2.6 | 99 | 108 | 234 |
| Example 7 | Butt | B2-2 | 310 | 242 | 2.6 | B2-2 | 310 | 242 | 2.6 | 2.6 | 2.6 | 99 | 151 | 240 |
| Example 8 | Butt | B2-2 | 310 | 242 | 2.6 | B2-2 | 310 | 242 | 2.6 | 2.6 | 2.6 | 99 | 178 | 237 |
| Example 9 | Butt | B2-1 | 310 | 242 | 2.0 | B1-1 | 280 | 219 | 2.0 | 2.0 | 2.0 | 99 | 70 | 248 |
| Example 10 | Butt | B2-2 | 310 | 242 | 2.6 | B2-2 | 310 | 242 | 2.6 | 2.6 | 2.6 | 99 | 198 | 242 |
| Example 11 | Lap | B1-1 | 280 | 219 | 2.0 | B1-1 | 280 | 219 | 2.0 | 2.0 | 2.0 | 99 | 167 | 224 |
| Example 12 | Butt | B1-1 | 280 | 219 | 2.0 | B1-1 | 280 | 219 | 2.0 | 2.0 | 2.0 | 99 | 71 | 239 |
| Example 13 | Butt | B1-1 | 280 | 219 | 2.0 | B1-1 | 280 | 219 | 2.0 | 2.0 | 2.0 | 99 | 98 | 238 |
| Example 14 | Butt | B2-1 | 310 | 242 | 2.0 | B2-1 | 310 | 242 | 2.0 | 2.0 | 2.0 | 99 | 84 | 246 |
| Example 15 | Butt | B2-1 | 310 | 242 | 2.0 | B2-1 | 310 | 242 | 2.0 | 2.0 | 2.0 | 99 | 161 | 241 |
| Example 16 | Butt | B1-2 | 280 | 219 | 2.6 | B1-2 | 280 | 219 | 2.6 | 2.6 | 2.6 | 99 | 93 | 238 |
| Example 17 | Butt | B1-2 | 280 | 219 | 2.6 | B1-2 | 280 | 219 | 2.6 | 2.6 | 2.6 | 99 | 110 | 233 |
| Example 18 | Butt | B2-2 | 310 | 242 | 2.6 | B2-2 | 310 | 242 | 2.6 | 2.6 | 2.6 | 99 | 145 | 242 |
| Example 19 | Butt | B2-2 | 310 | 242 | 2.6 | B2-2 | 310 | 242 | 2.6 | 2.6 | 2.6 | 99 | 181 | 232 |
| Example 20 | Butt | B2-1 | 310 | 242 | 2.0 | B1-1 | 280 | 219 | 2.0 | 2.0 | 2.0 | 99 | 65 | 253 |
| Example 21 | Butt | B2-2 | 310 | 242 | 2.6 | B2-2 | 310 | 242 | 2.6 | 2.6 | 2.6 | 99 | 197 | 243 |
| Example 22 | Lap | B1-1 | 280 | 219 | 2.0 | B1-1 | 280 | 219 | 2.0 | 2.0 | 2.0 | 99 | 165 | 225 |
| Comparative Example 1 | Butt | B2-1 | 310 | 242 | 2.0 | B2-1 | 310 | 242 | 2.0 | 2.0 | 2.0 | — | — | — |
| Comparative Example 2 | Butt | B2-1 | 310 | 242 | 2.0 | B2-1 | 310 | 242 | 2.0 | 2.0 | 2.0 | — | — | — |
| Comparative Example 3 | Butt | B1-1 | 280 | 219 | 2.0 | B2-1 | 310 | 242 | 2.0 | 2.0 | 2.0 | 99 | 79 | 248 |
| Comparative Example 4 | Butt | B1-2 | 280 | 219 | 2.6 | B2-2 | 310 | 242 | 2.6 | 2.6 | 2.6 | 99 | 98 | 244 |

TABLE 5-continued

| | | | | | | | | | | | | | | |
|---|---|---|---|---|---|---|---|---|---|---|---|---|---|---|
| Comparative Example 5 | Lap | B1-1 | 280 | 219 | 2.0 | B1-1 | 280 | 219 | 2.0 | 2.0 | 2.0 | — | — | — |
| Comparative Example 6 | Butt | B2-1 | 310 | 242 | 2.0 | B2-1 | 310 | 242 | 2.0 | 2.0 | 2.0 | — | — | — |
| Comparative Example 7 | Butt | B2-1 | 310 | 242 | 2.0 | B2-1 | 310 | 242 | 2.0 | 2.0 | 2.0 | — | — | — |
| Comparative Example 8 | Butt | B1-1 | 280 | 219 | 2.0 | B2-1 | 310 | 242 | 2.0 | 2.0 | 2.0 | 99 | 75 | 248 |
| Comparative Example 9 | Butt | B1-2 | 280 | 219 | 2.6 | B2-2 | 310 | 242 | 2.6 | 2.6 | 2.6 | — | — | — |
| Comparative Example 10 | Lap | B1-1 | 280 | 219 | 2.0 | B1-1 | 280 | 219 | 2.0 | 2.0 | 2.0 | — | — | — |

| | Joined portion | | Thermo-mechanically affected zone | | | | Satisfy or not satisfy the Expression | | | | | |
|---|---|---|---|---|---|---|---|---|---|---|---|---|
| | | | First electrical steel strip side | | Second electrical steel strip side | | | | | | | |
| | | | Ferrite phase | | Ferrite phase | | | | | | | |
| | TszL (mm) | TszH (mm) | area ratio (%) | Dhaz1 (μm) | area ratio (%) | Dhaz2 (μm) | Expression (1) | Expression (2) | Expression (3) | Expression (4) | Expression (5) | Expression (6) |
| Example 1 | 1.9 | 2.0 | 99 | 201 | 99 | 203 | ○ | ○ | ○ | ○ | ○ | ○ |
| Example 2 | 1.8 | 2.0 | 99 | 208 | 99 | 210 | ○ | ○ | ○ | ○ | ○ | ○ |
| Example 3 | 1.5 | 1.9 | 99 | 240 | 99 | 235 | ○ | ○ | ○ | ○ | X | ○ |
| Example 4 | 1.9 | 2.0 | 99 | 287 | 99 | 290 | ○ | ○ | ○ | ○ | ○ | ○ |
| Example 5 | 2.2 | 2.7 | 99 | 204 | 99 | 206 | ○ | ○ | ○ | ○ | ○ | ○ |
| Example 6 | 2.5 | 2.6 | 99 | 210 | 99 | 208 | ○ | ○ | ○ | ○ | ○ | ○ |
| Example 7 | 2.5 | 2.6 | 99 | 273 | 99 | 278 | ○ | ○ | ○ | ○ | ○ | ○ |
| Example 8 | 2.6 | 2.6 | 99 | 291 | 99 | 295 | ○ | ○ | ○ | ○ | ○ | ○ |
| Example 9 | 1.8 | 2.0 | 99 | 200 | 99 | 198 | ○ | ○ | ○ | ○ | ○ | ○ |
| Example 10 | 2.3 | 2.6 | 99 | 308 | 99 | 307 | ○ | ○ | ○ | ○ | ○ | ○ |
| Example 11 | 3.5 | 3.8 | 99 | 253 | 99 | 251 | ○ | ○ | ○ | ○ | ○ | X |
| Example 12 | 1.8 | 2.0 | 99 | 210 | 99 | 208 | ○ | ○ | ○ | ○ | ○ | ○ |
| Example 13 | 1.8 | 2.0 | 99 | 209 | 99 | 210 | ○ | ○ | ○ | ○ | ○ | ○ |
| Example 14 | 1.5 | 1.9 | 99 | 235 | 99 | 233 | ○ | ○ | ○ | ○ | X | ○ |
| Example 15 | 1.8 | 2.0 | 99 | 282 | 99 | 286 | ○ | ○ | ○ | ○ | ○ | ○ |
| Example 16 | 2.3 | 2.7 | 99 | 210 | 99 | 212 | ○ | ○ | ○ | ○ | ○ | ○ |
| Example 17 | 2.5 | 2.6 | 99 | 215 | 99 | 218 | ○ | ○ | ○ | ○ | ○ | ○ |
| Example 18 | 2.4 | 2.6 | 99 | 268 | 99 | 273 | ○ | ○ | ○ | ○ | ○ | ○ |
| Example 19 | 2.5 | 2.6 | 99 | 281 | 99 | 288 | ○ | ○ | ○ | ○ | ○ | ○ |
| Example 20 | 1.8 | 2.0 | 99 | 198 | 99 | 197 | ○ | ○ | ○ | ○ | ○ | ○ |
| Example 21 | 2.3 | 2.6 | 99 | 307 | 99 | 305 | ○ | ○ | ○ | ○ | ○ | ○ |
| Example 22 | 3.6 | 3.9 | 99 | 251 | 99 | 251 | ○ | ○ | ○ | ○ | ○ | X |
| Comparative Example 1 | — | — | — | — | — | — | — | — | — | — | — | — |
| Comparative Example 2 | — | — | — | — | — | — | — | — | — | — | — | — |
| Comparative Example 3 | 1.8 | 2.2 | 99 | 203 | 99 | 223 | ○ | ○ | ○ | ○ | ○ | ○ |
| Comparative Example 4 | 2.5 | 2.8 | 99 | 218 | 99 | 235 | ○ | ○ | ○ | ○ | ○ | ○ |
| Comparative Example 5 | — | — | — | — | — | — | — | — | — | — | — | — |
| Comparative Example 6 | — | — | — | — | — | — | — | — | — | — | — | — |
| Comparative Example 7 | — | — | — | — | — | — | — | — | — | — | — | — |
| Comparative Example 8 | 1.8 | 2.0 | 99 | 185 | 99 | 199 | ○ | ○ | ○ | ○ | ○ | ○ |
| Comparative Example 9 | — | — | — | — | — | — | — | — | — | — | — | — |
| Comparative Example 10 | — | — | — | — | — | — | — | — | — | — | — | — |

TABLE 6

| | Expression (1) | Expression (2) | Expression (3) | Expression (4) | Expression (5) | Expression (6) | Surface defect | Internal defect | Erichsen value of welded joint (mm) | Erichsen value ratio (%) | 90% maintained maximum joint number | Evaluation of durability of rotating tools |
|---|---|---|---|---|---|---|---|---|---|---|---|---|
| Example 1 | ○ | ○ | ○ | ○ | ○ | ○ | No | No | 12.1 | 98 | 26 | ○ |
| Example 2 | ○ | ○ | ○ | ○ | ○ | ○ | No | No | 11.6 | 94 | 28 | ○ |
| Example 3 | ○ | ○ | ○ | ○ | X | ○ | No | No | 3.2 | 91 | 28 | ○ |
| Example 4 | ○ | ○ | ○ | ○ | ○ | ○ | No | No | 2.9 | 83 | 30 | ○ |
| Example 5 | ○ | ○ | ○ | ○ | ○ | ○ | No | No | 13.1 | 97 | 33 | ○ |
| Example 6 | ○ | ○ | ○ | ○ | ○ | ○ | No | No | 13.4 | 99 | 33 | ○ |
| Example 7 | ○ | ○ | ○ | ○ | ○ | ○ | No | No | 3.2 | 84 | 32 | ○ |
| Example 8 | ○ | ○ | ○ | ○ | ○ | ○ | No | No | 3.2 | 84 | 34 | ○ |
| Example 9 | ○ | ○ | ○ | ○ | ○ | ○ | No | No | 3.3 | 94 | 29 | ○ |
| Example 10 | ○ | ○ | ○ | ○ | ○ | ○ | No | No | 3.1 | 82 | 26 | ○ |
| Example 11 | ○ | ○ | ○ | ○ | ○ | X | No | No | 10.1 | 81 | 25 | ○ |
| Example 12 | ○ | ○ | ○ | ○ | ○ | ○ | No | No | 11.0 | 89 | 35 | ⊚ |
| Example 13 | ○ | ○ | ○ | ○ | ○ | ○ | No | No | 11.8 | 95 | 36 | ⊚ |
| Example 14 | ○ | ○ | ○ | ○ | X | ○ | No | No | 3.0 | 86 | 37 | ⊚ |
| Example 15 | ○ | ○ | ○ | ○ | ○ | ○ | No | No | 3.3 | 94 | 36 | ⊚ |
| Example 16 | ○ | ○ | ○ | ○ | ○ | ○ | No | No | 12.5 | 93 | 38 | ⊚ |
| Example 17 | ○ | ○ | ○ | ○ | ○ | ○ | No | No | 12.9 | 96 | 36 | ⊚ |
| Example 18 | ○ | ○ | ○ | ○ | ○ | ○ | No | No | 3.4 | 89 | 36 | ⊚ |
| Example 19 | ○ | ○ | ○ | ○ | ○ | ○ | No | No | 3.5 | 92 | 40 | ⊚ |
| Example 20 | ○ | ○ | ○ | ○ | ○ | ○ | No | No | 3.4 | 97 | 38 | ⊚ |
| Example 21 | ○ | ○ | ○ | ○ | ○ | ○ | No | No | 3.1 | 82 | 36 | ⊚ |
| Example 22 | ○ | ○ | ○ | ○ | ○ | X | No | No | 10.1 | 81 | 35 | ⊚ |
| Comparative Example 1 | — | — | — | — | — | — | Yes | — | — | — | 0 | X |
| Comparative Example 2 | — | — | — | — | — | — | Yes | — | — | — | 0 | X |
| Comparative Example 3 | ○ | ○ | ○ | ○ | ○ | ○ | No | No | 3.1 | 89 | 13 | X |
| Comparative Example 4 | ○ | ○ | ○ | ○ | ○ | ○ | No | No | 3.2 | 84 | 10 | X |
| Comparative Example 5 | — | — | — | — | — | — | No | Yes | — | — | 0 | X |
| Comparative Example 6 | — | — | — | — | — | — | Yes | — | — | — | 0 | X |
| Comparative Example 7 | — | — | — | — | — | — | Yes | — | — | — | 0 | X |
| Comparative Example 8 | ○ | ○ | ○ | ○ | ○ | ○ | No | No | 3.0 | 86 | 15 | X |
| Comparative Example 9 | — | — | — | — | — | — | Nc | Yes | — | — | 0 | X |
| Comparative Example 10 | — | — | — | — | — | — | No | Yes | — | — | 0 | X |

○ Satisfies the relationship in the Expression
x Does not satisfy the relationship in the Expression Table 6 indicates that for all of the Examples, electrical steel strip welded joints were obtained that were free of defects and had excellent fracture inhibition effects, while performing joining at a high joining speed of 3500 mm/min or more. Further, the Examples were superior in terms of durability (life span) of the rotating tools.

On the other hand, when performing joining at a joining speed of 3500 mm/min or more for the Comparative Examples, defects occurred, a sufficient fracture inhibition effect was not achieved, or the durability of the rotating tools was insufficient.

REFERENCE SIGNS LIST

1 first electrical steel strip (material to be joined)
2 second electrical steel strip (material to be joined)
3-1 rotating tool (front side rotating tool)
3-2 rotating tool (back side rotating tool)
4 joined portion
4-1 thermo-mechanically affected zone (first electrical steel strip side)
4-2 thermo-mechanically affected zone (second electrical steel strip side)
5-1, 5-2 shoulder
6-1, 6-2 probe
7 gripping device
9-1, 9-2 lead end
10-1 heating device (front side heating device)
10-2 heating device (back side heating device)
11 driving device for the rotating tools
12 operation control device

The invention claimed is:
1. An electrical steel strip friction stir welding method for joining a first electrical steel strip and a second electrical steel strip as a material to be joined by a pair of rotating tools facing each other, comprising:
   a preheating process of preheating an unjoined portion of the material to be joined by a heating device disposed in front of the rotating tools in a joining direction on at least one side of the material to be joined; and
   a joining process of pressing the rotating tools into the unjoined portion of the material to be joined from both sides while rotating the rotating tools in opposite directions, and joining the first electrical steel strip and the second electrical steel strip by moving the rotating tools in the joining direction, wherein the unjoined portion of the material to be joined is a butted portion or an overlapped portion between an end of the first electrical steel strip and an end of the second electrical steel strip following the first electrical steel strip, the preheating process and the joining process are performed continuously by moving the heating device in the joining direction in conjunction with the rotating tools, the diameter D (mm) of shoulders of the rotating tools satisfies the relationship of the following Expression (7), and a rotation speed RS (r/min) of the rotating tools, the diameter D (mm) of the shoulders of the rotating tools, and a joining speed JS (mm/min), expressed as $RS \times D^3 / JS$, satisfy the relationship of the following Expression (8), $$4 \times TJ \leq D \leq 10 \times TJ \tag{7}$$

$$180 \times TJ \leq RS \times D^3/JS \leq 1500 \times TJ \tag{8}$$

where TJ is defined such that, when the unjoined portion is the butted portion, TJ is an average value (mm) of the thickness of the first electrical steel strip and the thickness of the second electrical steel strip, and when the unjoined portion is the overlapped portion, TJ is the thickness (mm) of the overlapped portion.

2. The electrical steel strip friction stir welding method according to claim 1, wherein in the joining process, joining is performed under conditions that steel microstructures of a joined portion and a thermo-mechanically affected zone formed by joining of the first electrical steel strip and the second electrical steel strip become mainly ferrite phase, respectively, and the relationships of the following Expressions (1) to (4) are satisfied, $$Dsz \leq 200 \ \mu m \tag{1}$$

$$Dhaz1 \leq Dbm1 \tag{2}$$

$$Dhaz2 \leq Dbm2 \tag{3}$$

$$0.9 \times (Hbm1 + Hbm2)/2 \leq Hsz \leq 1.2 \times (Hbm1 + Hbm2)/2 \tag{4}$$

wherein

Dsz is an average value (μm) of ferrite grain size of the joined portion,

Dhaz1 is an average value (μm) of ferrite grain size of a thermo-mechanically affected zone on a first electrical steel strip side, Dhaz2 is an average value (μm) of ferrite grain size of a thermo-mechanically affected zone on a second electrical steel strip side, Dbm1 is an average value (μm) of ferrite grain size of a base metal portion of the first electrical steel strip, Dbm2 is an average value (μm) of ferrite grain size of a base metal portion of the second electrical steel strip, Hsz is an average value of hardness of the joined portion, Hbm1 is an average value of hardness of the base metal portion of the first electrical steel strip, and Hbm2 is an average value of hardness of the base metal portion of the second electrical steel strip.

3. The electrical steel strip friction stir welding method according to claim 2, wherein in the joining process, the joining is performed under conditions satisfying the relationships of the following Expressions (5) and (6), $$0.8 \times TbmL \leq TszL \tag{5}$$

$$TszH \leq 1.3 \times TbmH \tag{6}$$

wherein

TszL is the minimum value (mm) of the thickness of the joined portion,

TszH is the maximum value (mm) of the thickness of the joined portion,

TbmL is the thickness (mm) of the thinner of the first electrical steel strip and the second electrical steel strip, TbmH is the thickness (mm) of the thicker of the first electrical steel strip and the second electrical steel strip, and when the thicknesses of the first electrical steel strip and the second electrical steel strip are the same, TbmL=TbmH.

4. The electrical steel strip friction stir welding method according to claim 3, wherein in the joining process, a gap G (mm) between the shoulders of the rotating tools satisfies the relationship of the following Expression (9), $$0.4 \times TJ \leq G \leq 0.9 \times TJ. \tag{9}$$

5. The electrical steel strip friction stir welding method according to claim 2, wherein in the joining process, a gap G (mm) between the shoulders of the rotating tools satisfies the relationship of the following Expression (9), $$0.4 \times TJ \leq G \leq 0.9 \times TJ. \tag{9}$$

6. The electrical steel strip friction stir welding method according to claim 2, wherein the rotating tools are rotating tools without probes.

7. The electrical steel strip friction stir welding method according to claim 1, wherein in the joining process, the joining is performed under conditions satisfying the relationships of the following Expressions (5) and (6), $$0.8 \times TbmL \leq TszL \tag{5}$$

$$TszH \leq 1.3 \times TbmH \tag{6}$$

wherein

TszL is the minimum value (mm) of the thickness of the joined portion,

TszH is the maximum value (mm) of the thickness of the joined portion,

TbmL is the thickness (mm) of the thinner of the first electrical steel strip and the second electrical steel strip, TbmH is the thickness (mm) of the thicker of the first electrical steel strip and the second electrical steel strip, and when the thicknesses of the first electrical steel strip and the second electrical steel strip are the same, TbmL=TbmH.

8. The electrical steel strip friction stir welding method according to claim 7, wherein in the joining process, a gap G (mm) between the shoulders of the rotating tools satisfies the relationship of the following Expression (9), $$0.4 \times TJ \le G \le 0.9 \times TJ. \quad (9)$$

9. The electrical steel strip friction stir welding method according to claim 7, wherein the rotating tools are rotating tools without probes.

10. The electrical steel strip friction stir welding method according to claim 1, wherein in the joining process, a gap G (mm) between the shoulders of the rotating tools satisfies the relationship of the following Expression (9), $$0.4 \times TJ \le G \le 0.9 \times TJ. \quad (9)$$

11. The electrical steel strip friction stir welding method according to claim 1, wherein the rotating tools are rotating tools without probes.

12. The electrical steel strip friction stir welding method according to claim 11, wherein the leading ends of the rotating tools are each a flat, convex curved, or concave curved surface.

13. The electrical steel strip friction stir welding method according to claim 11, wherein the leading ends of the rotating tools each have a spiral-shaped stepped portion spiraling in the opposite direction to rotation.

14. The electrical steel strip friction stir welding method according to claim 13, wherein each of the spiral-shaped stepped portions becomes gradually lower from the center to the periphery of the leading end of the rotating tool.

15. The electrical steel strip friction stir welding method according to claim 13, wherein each of the spiral-shaped stepped portions becomes gradually higher from the center to the periphery of the leading end of the rotating tool.

16. The electrical steel strip friction stir welding method according to claim 11, wherein a tilt angle α of the rotating tools is 0°.

17. The electrical steel strip friction stir welding method according to claim 1, wherein in the preheating process, a preheating temperature of the material to be joined satisfies the relationships of the following Expressions (11) to (13), $$100 \le TP_{W=0} \le 1000 \quad (11)$$

$$100 \le TP_{W=0.2D} \le 1000 \quad (12)$$

$$50 \le TP_{W=0.5D} \le 800 \quad (13)$$

wherein
W is a distance (mm) separated from a joining center line of the material to be joined in a perpendicular-to-joining direction, $TP_{W=0}$, $TP_{W=0.2D}$, and $TP_{W=0.5D}$ are preheating temperatures (° C.) at a surface of the material to be joined at positions where W=0, 0.2×D, and 0.5×D, respectively, and D is the diameter (mm) of the shoulders of the rotating tools.

18. The electrical steel strip friction stir welding method according to claim 17, wherein in the preheating process, the preheating temperature of the material to be joined satisfies the relationships of the following Expressions (14) and (15), $$0.70 \le TP_{W=0.2D}/TP_{W=0} \le 1.00 \quad (14)$$

$$TP_{W=0.5D}/TP_{W=0} \le 0.45. \quad (15)$$

19. The electrical steel strip friction stir welding method according to claim 1, wherein the heating device is a high-frequency induction heating device, a laser irradiation heating device, or a device combining a high-frequency induction heating device and a laser irradiation heating device.

20. A method of producing an electrical steel strip, the method comprising:
joining a first electrical steel strip and a second electrical steel strip by the electrical steel strip friction stir welding method according to claim 1 to obtain a joined steel strip; and
cold rolling the joined steel strip to obtain a cold-rolled steel strip.

* * * * *